US012321890B2

(12) United States Patent
Fisher et al.

(10) Patent No.: US 12,321,890 B2
(45) Date of Patent: *Jun. 3, 2025

(54) DIRECTIONAL IMPRESSION ANALYSIS USING DEEP LEARNING

(71) Applicant: STANDARD COGNITION, CORP., San Francisco, CA (US)

(72) Inventors: Jordan E. Fisher, San Francisco, CA (US); Michael S. Suswal, San Francisco, CA (US); Warren Green, San Francisco, CA (US)

(73) Assignee: STANDARD COGNITION, CORP., San Francisco, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 18/090,854

(22) Filed: Dec. 29, 2022

(65) Prior Publication Data

US 2023/0145190 A1 May 11, 2023

Related U.S. Application Data

(63) Continuation of application No. 17/089,012, filed on Nov. 4, 2020, now Pat. No. 11,544,866, which is a
(Continued)

(51) Int. Cl.
*G06Q 10/087* (2023.01)
*G06F 16/53* (2019.01)
(Continued)

(52) U.S. Cl.
CPC .......... *G06Q 10/087* (2013.01); *G06F 16/53* (2019.01); *G06F 18/217* (2023.01); *G06T 7/70* (2017.01);
(Continued)

(58) Field of Classification Search
CPC ...... G06F 16/53; G06F 18/217; G06Q 10/087; G06T 2200/24; G06T 2207/10016;
(Continued)

(56) References Cited

U.S. PATENT DOCUMENTS 6,154,559 A 11/2000 Beardsley
6,561,417 B1 5/2003 Gadd
(Continued)

FOREIGN PATENT DOCUMENTS

CN 104778690 B 6/2017
EP 1574986 B1 7/2008
(Continued)

OTHER PUBLICATIONS

Black et al., "Multi View Image Surveillance and Tracking," IEEE Proceedings of the Workshop on Motion and Video Computing, 2002, pp. 1-6.
(Continued)

*Primary Examiner* — Anner N Holder
(74) *Attorney, Agent, or Firm* — Haynes Beffel & Wolfeld LLP; Andrew L. Dunlap

(57) ABSTRACT

Systems and techniques are provided for detecting gaze direction of subjects in an area of real space. The system receives a plurality of sequences of frames of corresponding fields of view in the real space. The system uses sequences of frames in a plurality of sequences of frames to identify locations of an identified subject and gaze directions of the subject in the area of real space over time. The system includes logic having access to a database identifying locations of items in the area of real space. The system identifies items in the area of real space matching the identified gaze directions of the identified subject.

20 Claims, 13 Drawing Sheets

Related U.S. Application Data continuation of application No. 16/388,772, filed on Apr. 18, 2019, now Pat. No. 10,853,965, which is a continuation-in-part of application No. 15/945,473, filed on Apr. 4, 2018, now Pat. No. 10,474,988, which is a continuation-in-part of application No. 15/907,112, filed on Feb. 27, 2018, now Pat. No. 10,133,933, which is a continuation-in-part of application No. 15/847,796, filed on Dec. 19, 2017, now Pat. No. 10,055,853.

(60) Provisional application No. 62/703,785, filed on Jul. 26, 2018, provisional application No. 62/542,077, filed on Aug. 7, 2017.

(51) Int. Cl.
  *G06F 18/21* (2023.01)
  *G06T 7/70* (2017.01)
  *G06V 40/18* (2022.01)

(52) U.S. Cl.
  CPC ........ *G06V 40/197* (2022.01); *G06T 2200/24* (2013.01); *G06T 2207/10016* (2013.01); *G06T 2207/20081* (2013.01); *G06T 2207/30201* (2013.01)

(58) Field of Classification Search
  CPC . G06T 2207/20081; G06T 2207/30201; G06T 7/70; G06V 40/197
  See application file for complete search history.

(56) References Cited

U.S. PATENT DOCUMENTS

| | | |
|---|---|---|
| 7,050,624 B2 | 5/2006 | Dialameh et al. |
| 7,050,652 B2 | 5/2006 | Stanek |
| 7,742,623 B1 | 6/2010 | Moon et al. |
| 8,009,863 B1 | 8/2011 | Sharma et al. |
| 8,219,438 B1 | 7/2012 | Moon et al. |
| 8,261,256 B1 | 9/2012 | Adler et al. |
| 8,279,325 B2 | 10/2012 | Pitts et al. |
| 8,577,705 B1 | 11/2013 | Baboo et al. |
| 8,624,725 B1 | 1/2014 | MacGregor |
| 8,749,630 B2 | 6/2014 | Alahi et al. |
| 9,036,028 B2 | 5/2015 | Buehler |
| 9,058,523 B2 | 6/2015 | Merkel et al. |
| 9,262,681 B1 | 2/2016 | Mishra |
| 9,269,012 B2 | 2/2016 | Fotland |
| 9,269,093 B2 | 2/2016 | Lee et al. |
| 9,294,873 B1 | 3/2016 | MacGregor |
| 9,449,233 B2 | 9/2016 | Taylor |
| 9,489,623 B1 | 11/2016 | Sinyavskiy et al. |
| 9,494,532 B2 | 11/2016 | Xie et al. |
| 9,536,177 B2 | 1/2017 | Chalasani et al. |
| 9,582,891 B2 | 2/2017 | Geiger et al. |
| 9,595,127 B2 | 3/2017 | Champion et al. |
| 9,652,751 B2 | 5/2017 | Aaron et al. |
| 9,846,810 B2 | 12/2017 | Partis |
| 9,881,221 B2 | 1/2018 | Bala et al. |
| 9,886,827 B2 | 2/2018 | Schoner |
| 9,911,290 B1 | 3/2018 | Zalewski et al. |
| 10,055,853 B1 | 8/2018 | Fisher et al. |
| 10,083,453 B2 | 9/2018 | Campbell |
| 10,127,438 B1 | 11/2018 | Fisher et al. |
| 10,133,933 B1 | 11/2018 | Fisher et al. |
| 10,165,194 B1 | 12/2018 | Baldwin |
| 10,169,677 B1 | 1/2019 | Ren et al. |
| 10,175,340 B1 | 1/2019 | Abari et al. |
| 10,192,408 B2 | 1/2019 | Schoner |
| 10,202,135 B2 | 2/2019 | Mian et al. |
| 10,210,737 B2 | 2/2019 | Zhao |
| 10,217,120 B1 | 2/2019 | Shin et al. |
| 10,242,393 B1 | 3/2019 | Kumar et al. |
| 10,262,331 B1 | 4/2019 | Sharma et al. |
| 10,332,089 B1 | 6/2019 | Asmi et al. |
| 10,354,262 B1 | 7/2019 | Hershey et al. |
| 10,387,896 B1 | 8/2019 | Hershey et al. |
| 10,438,277 B1 | 10/2019 | Jiang et al. |
| 10,445,694 B2 | 10/2019 | Fisher et al. |
| 10,474,877 B2 | 11/2019 | Huang et al. |
| 10,474,988 B2 | 11/2019 | Fisher et al. |
| 10,474,991 B2 | 11/2019 | Fisher et al. |
| 10,474,992 B2 | 11/2019 | Fisher et al. |
| 10,474,993 B2 | 11/2019 | Fisher et al. |
| 10,529,137 B1 | 1/2020 | Black et al. |
| 10,650,545 B2 | 5/2020 | Fisher et al. |
| 10,776,926 B2 | 9/2020 | Shrivastava |
| 10,810,539 B1 | 10/2020 | Mohanty et al. |
| 10,853,965 B2 | 12/2020 | Fisher et al. |
| 11,544,866 B2 | 1/2023 | Fisher et al. |
| 2003/0107649 A1 | 6/2003 | Flickner et al. |
| 2003/0154141 A1 | 8/2003 | Capazario et al. |
| 2004/0099736 A1 | 5/2004 | Neumark |
| 2004/0131254 A1 | 7/2004 | Liang et al. |
| 2005/0177446 A1 | 8/2005 | Hoblit |
| 2005/0201612 A1 | 9/2005 | Park et al. |
| 2006/0132491 A1 | 6/2006 | Riach et al. |
| 2006/0279630 A1 | 12/2006 | Aggarwal et al. |
| 2007/0021863 A1 | 1/2007 | Mountz et al. |
| 2007/0021864 A1 | 1/2007 | Mountz et al. |
| 2007/0182718 A1 | 8/2007 | Schoener et al. |
| 2007/0282665 A1 | 12/2007 | Buehler et al. |
| 2008/0001918 A1 | 1/2008 | Hsu et al. |
| 2008/0159634 A1 | 7/2008 | Sharma et al. |
| 2008/0170776 A1 | 7/2008 | Albertson et al. |
| 2008/0181507 A1 | 7/2008 | Gope et al. |
| 2008/0211915 A1 | 9/2008 | McCubbrey |
| 2008/0243614 A1 | 10/2008 | Tu et al. |
| 2009/0041297 A1 | 2/2009 | Zhang et al. |
| 2009/0057068 A1 | 3/2009 | Lin et al. |
| 2009/0083815 A1 | 3/2009 | McMaster et al. |
| 2009/0217315 A1 | 8/2009 | Malik et al. |
| 2009/0222313 A1 | 9/2009 | Kannan et al. |
| 2009/0307226 A1 | 12/2009 | Koster et al. |
| 2010/0021009 A1 | 1/2010 | Yao |
| 2010/0103104 A1 | 4/2010 | Son et al. |
| 2010/0169792 A1 | 7/2010 | Ascar et al. |
| 2010/0208941 A1 | 8/2010 | Broaddus et al. |
| 2010/0283860 A1 | 11/2010 | Nader |
| 2011/0141011 A1 | 6/2011 | Lashina et al. |
| 2011/0209042 A1 | 8/2011 | Porter |
| 2011/0228976 A1 | 9/2011 | Fitzgibbon et al. |
| 2011/0317012 A1 | 12/2011 | Hammadou |
| 2011/0317016 A1 | 12/2011 | Saeki et al. |
| 2011/0320322 A1 | 12/2011 | Roslak et al. |
| 2012/0119879 A1 | 5/2012 | Estes et al. |
| 2012/0159290 A1 | 6/2012 | Pulsipher et al. |
| 2012/0209749 A1 | 8/2012 | Hammad et al. |
| 2012/0245974 A1 | 9/2012 | Bonner et al. |
| 2012/0271712 A1 | 10/2012 | Katzin et al. |
| 2012/0275686 A1 | 11/2012 | Wilson et al. |
| 2012/0290401 A1 | 11/2012 | Neven |
| 2013/0011007 A1 | 1/2013 | Muriello et al. |
| 2013/0011049 A1 | 1/2013 | Kimura |
| 2013/0076898 A1 | 3/2013 | Philippe et al. |
| 2013/0103608 A1 | 4/2013 | Scipioni et al. |
| 2013/0156260 A1 | 6/2013 | Craig |
| 2013/0182114 A1 | 7/2013 | Zhang et al. |
| 2013/0201339 A1 | 8/2013 | Venkatesh |
| 2013/0325673 A1 | 12/2013 | Abdic et al. |
| 2014/0168477 A1 | 6/2014 | David |
| 2014/0172476 A1 | 6/2014 | Goulart |
| 2014/0188648 A1 | 7/2014 | Argue et al. |
| 2014/0207615 A1 | 7/2014 | Li et al. |
| 2014/0222501 A1 | 8/2014 | Hirakawa et al. |
| 2014/0282162 A1 | 9/2014 | Fein et al. |
| 2014/0289009 A1 | 9/2014 | Campbell |
| 2014/0304123 A1 | 10/2014 | Schwartz |
| 2014/0365333 A1* | 12/2014 | Hurewitz ............ G06Q 30/0201 705/26.7 |
| 2015/0009323 A1 | 1/2015 | Lei |
| 2015/0012396 A1 | 1/2015 | Puerini et al. |
| 2015/0019391 A1 | 1/2015 | Kumar et al. |

(56) References Cited

U.S. PATENT DOCUMENTS

| | | |
|---|---|---|
| 2015/0026010 A1 | 1/2015 | Ellison |
| 2015/0026646 A1 | 1/2015 | Ahn et al. |
| 2015/0039458 A1 | 2/2015 | Reid |
| 2015/0049914 A1 | 2/2015 | Alves |
| 2015/0124107 A1 | 5/2015 | Muriello et al. |
| 2015/0206188 A1 | 7/2015 | Tanigawa et al. |
| 2015/0208043 A1 | 7/2015 | Lee et al. |
| 2015/0213391 A1 | 7/2015 | Hasan |
| 2015/0221094 A1 | 8/2015 | Marcheselli et al. |
| 2015/0243036 A1 | 8/2015 | Hoffmann et al. |
| 2015/0262116 A1 | 9/2015 | Katircioglu et al. |
| 2015/0269740 A1 | 9/2015 | Mazurenko et al. |
| 2015/0287214 A1 | 10/2015 | O'Gorman et al. |
| 2015/0294397 A1 | 10/2015 | Croy et al. |
| 2015/0302593 A1 | 10/2015 | Mazurenko et al. |
| 2015/0310459 A1 | 10/2015 | Bernal et al. |
| 2015/0327794 A1 | 11/2015 | Rahman et al. |
| 2015/0332312 A1 | 11/2015 | Cosman |
| 2015/0341599 A1 | 11/2015 | Carey |
| 2015/0356610 A1 | 12/2015 | Ponoth |
| 2015/0363868 A1 | 12/2015 | Kleinhandler et al. |
| 2015/0379366 A1 | 12/2015 | Nomura et al. |
| 2016/0095511 A1 | 4/2016 | Taguchi et al. |
| 2016/0110760 A1 | 4/2016 | Herring et al. |
| 2016/0125245 A1 | 5/2016 | Saitwal et al. |
| 2016/0155011 A1 | 6/2016 | Sulc et al. |
| 2016/0171707 A1 | 6/2016 | Schwartz |
| 2016/0188962 A1 | 6/2016 | Taguchi |
| 2016/0189286 A1 | 6/2016 | Zohar et al. |
| 2016/0203525 A1 | 7/2016 | Hara et al. |
| 2016/0210602 A1* | 7/2016 | Siddique ............ G06Q 20/047 |
| 2016/0217157 A1 | 7/2016 | Shih et al. |
| 2016/0217417 A1 | 7/2016 | Ma et al. |
| 2016/0259994 A1 | 9/2016 | Ravindran et al. |
| 2016/0358145 A1 | 12/2016 | Montgomery |
| 2016/0371726 A1 | 12/2016 | Yamaji et al. |
| 2016/0381328 A1 | 12/2016 | Zhao |
| 2017/0011260 A1 | 1/2017 | Mihara et al. |
| 2017/0032193 A1 | 2/2017 | Yang |
| 2017/0068861 A1 | 3/2017 | Miller et al. |
| 2017/0116473 A1 | 4/2017 | Sashida et al. |
| 2017/0124096 A1 | 5/2017 | Hsi et al. |
| 2017/0154212 A1 | 6/2017 | Feris et al. |
| 2017/0161555 A1 | 6/2017 | Kumar et al. |
| 2017/0168586 A1 | 6/2017 | Sinha et al. |
| 2017/0178226 A1 | 6/2017 | Graham et al. |
| 2017/0193434 A1 | 7/2017 | Shah et al. |
| 2017/0206664 A1 | 7/2017 | Shen |
| 2017/0206669 A1 | 7/2017 | Saleemi et al. |
| 2017/0249339 A1 | 8/2017 | Lester |
| 2017/0255990 A1 | 9/2017 | Ramamurthy et al. |
| 2017/0278255 A1 | 9/2017 | Shingu et al. |
| 2017/0286901 A1* | 10/2017 | Skaff .................... G06V 10/751 |
| 2017/0308911 A1 | 10/2017 | Barham et al. |
| 2017/0309136 A1 | 10/2017 | Schoner |
| 2017/0323376 A1 | 11/2017 | Glaser et al. |
| 2018/0003315 A1 | 1/2018 | Reed |
| 2018/0012072 A1 | 1/2018 | Glaser et al. |
| 2018/0012080 A1 | 1/2018 | Glaser et al. |
| 2018/0014382 A1 | 1/2018 | Glaser et al. |
| 2018/0025175 A1 | 1/2018 | Kato |
| 2018/0032799 A1 | 2/2018 | Marcheselli et al. |
| 2018/0033015 A1 | 2/2018 | Opalka et al. |
| 2018/0033151 A1 | 2/2018 | Matsumoto et al. |
| 2018/0068431 A1 | 3/2018 | Takeda et al. |
| 2018/0070056 A1 | 3/2018 | DeAngelis et al. |
| 2018/0088900 A1 | 3/2018 | Glaser et al. |
| 2018/0150788 A1 | 5/2018 | Vepakomma et al. |
| 2018/0165728 A1 | 6/2018 | McDonald et al. |
| 2018/0181995 A1 | 6/2018 | Burry et al. |
| 2018/0189600 A1 | 7/2018 | Astrom et al. |
| 2018/0191952 A1 | 7/2018 | Ardo et al. |
| 2018/0217223 A1 | 8/2018 | Kumar et al. |
| 2018/0225625 A1 | 8/2018 | DiFatta et al. |
| 2018/0232796 A1 | 8/2018 | Glaser et al. |
| 2018/0240180 A1 | 8/2018 | Glaser et al. |
| 2018/0295424 A1 | 10/2018 | Taylor et al. |
| 2018/0322616 A1 | 11/2018 | Guigues |
| 2018/0329762 A1 | 11/2018 | Li et al. |
| 2018/0332235 A1 | 11/2018 | Glaser |
| 2018/0332236 A1 | 11/2018 | Glaser et al. |
| 2018/0343417 A1 | 11/2018 | Davey |
| 2018/0365755 A1 | 12/2018 | Bekbolatov et al. |
| 2018/0373928 A1 | 12/2018 | Glaser et al. |
| 2019/0005479 A1 | 1/2019 | Glaser et al. |
| 2019/0034735 A1 | 1/2019 | Cuban et al. |
| 2019/0043003 A1 | 2/2019 | Fisher et al. |
| 2019/0147709 A1 | 5/2019 | Schoner |
| 2019/0156273 A1 | 5/2019 | Fisher et al. |
| 2019/0156274 A1 | 5/2019 | Fisher et al. |
| 2019/0156275 A1 | 5/2019 | Fisher et al. |
| 2019/0156276 A1 | 5/2019 | Fisher et al. |
| 2019/0156277 A1 | 5/2019 | Fisher et al. |
| 2019/0156506 A1 | 5/2019 | Fisher et al. |
| 2019/0188876 A1 | 6/2019 | Song et al. |
| 2019/0244386 A1 | 8/2019 | Fisher et al. |
| 2019/0244500 A1 | 8/2019 | Fisher et al. |
| 2019/0251340 A1 | 8/2019 | Brown et al. |
| 2019/0347611 A1 | 11/2019 | Fisher et al. |
| 2019/0377957 A1 | 12/2019 | Johnston et al. |
| 2019/0378205 A1 | 12/2019 | Glaser et al. |
| 2019/0392318 A1 | 12/2019 | Ghafoor et al. |
| 2020/0074165 A1 | 3/2020 | Ghafoor et al. |
| 2020/0074393 A1 | 3/2020 | Fisher et al. |
| 2020/0074394 A1 | 3/2020 | Fisher et al. |
| 2020/0074432 A1 | 3/2020 | Valdman et al. |
| 2020/0118400 A1 | 4/2020 | Zalewski et al. |
| 2020/0234463 A1 | 7/2020 | Fisher et al. |
| 2020/0258241 A1 | 8/2020 | Liu et al. |
| 2020/0334834 A1 | 10/2020 | Fisher |
| 2020/0410713 A1 | 12/2020 | Auer et al. |
| 2021/0279475 A1 | 9/2021 | Tusch et al. |

FOREIGN PATENT DOCUMENTS

| | | |
|---|---|---|
| EP | 2555162 A1 | 2/2013 |
| EP | 3002710 A1 | 4/2016 |
| GB | 2560387 A | 9/2018 |
| GB | 2566762 A | 3/2019 |
| JP | 2011253344 A | 12/2011 |
| JP | 2013196199 A | 9/2013 |
| JP | 2014089626 A | 5/2014 |
| JP | 2016206782 A | 12/2016 |
| JP | 2017157216 A | 9/2017 |
| JP | 2018099317 A | 6/2018 |
| KR | 1020180032400 A | 3/2018 |
| WO | 0021021 A1 | 4/2000 |
| WO | 0243352 A2 | 5/2002 |
| WO | 02059836 A3 | 5/2003 |
| WO | 2008029159 A1 | 3/2008 |
| WO | 2013041444 A1 | 3/2013 |
| WO | 2013103912 A1 | 7/2013 |
| WO | 2014133779 A1 | 9/2014 |
| WO | 2015133699 A1 | 9/2015 |
| WO | 2016136144 A1 | 9/2016 |
| WO | 2016166508 A1 | 10/2016 |
| WO | 2017015390 A1 | 1/2017 |
| WO | 2017151241 A2 | 9/2017 |
| WO | 2017196822 A1 | 11/2017 |
| WO | 2018013438 A1 | 1/2018 |
| WO | 2018013439 A1 | 1/2018 |
| WO | 2018148613 A1 | 8/2018 |
| WO | 2018162929 A1 | 9/2018 |
| WO | 2018209156 A1 | 11/2018 |
| WO | 2018237210 A1 | 12/2018 |
| WO | 2019032304 A1 | 2/2019 |
| WO | 2019032305 A2 | 2/2019 |
| WO | 2019032306 A1 | 2/2019 |
| WO | 2019032307 A1 | 2/2019 |
| WO | 2020023795 | 1/2020 |
| WO | 2020023796 | 1/2020 |
| WO | 2020023798 | 1/2020 |
| WO | 2020023799 | 1/2020 |
| WO | 2020023801 | 1/2020 |

(56) References Cited

FOREIGN PATENT DOCUMENTS

| WO | 2020023926 |    | 1/2020  |
|----|------------|----|---------|
| WO | 2020023930 |    | 1/2020  |
| WO | 2020047555 | A1 | 3/2020  |
| WO | 2020214775 | A1 | 10/2020 |
| WO | 2020225562 | A1 | 11/2020 |

OTHER PUBLICATIONS

Camplani et al., "Background foreground segmentation with RGB-D Kinect data: An efficient combination of classifiers", Journal of Visual Communication and Image Representation, Academic Press, Inc., US, vol. 25, No. 1, Mar. 27, 2013, pp. 122-136,XP028804219, ISSN: 1047-3203, DOI: 10.1016/J.JVCIR.2013.03.009.

Cao et al., "Leveraging Convolutional Pose Machines for Fast and Accurate Head Pose Estimation", 2018 IEEE/RSJ International Conference on Intelligent Robots and Systems (IROS), Oct. 1, 2018, pp. 1089-1094.

Ceballos, Scikit-Learn Decision Trees Explained, https://towardsdatascience.com/scikit-learn-decision-trees-explained-803f3812290d, Feb. 22, 2019, 13 pages.

Gkioxari et al. "R-CNNs for Pose Estimation and Action Detection," Cornell University, Computer Science, Computer Vision and Pattern Recognition, arXiv.org > cs > arXiv:1406.5212, Jun. 19, 2014, 8 pages.

Grinciunaite et al. "Human Pose Estimation in Space and Time Using 3D CNN," ECCV Workshop on Brave new ideas for motion representations in videos, Oct. 2016, 7 pages.

Harville, "Stereo person tracking with adaptive plan-view templates of height and occupancy statistics," Image and Vision Computing, vol. 22, Issue 2, Feb. 1, 2004, pp. 127-142.

He et al. "Identity mappings in deep residual networks" (published at https://arxiv.org/pdf/1603.05027.pdf), Jul. 25, 2016, 15 pages.

Huang, et al. "Driver's view and vehicle surround estimation using omnidirectional video stream," IEEE IV2003 Intelligent Vehicles Symposium. Proceedings (Cat. No.03TH8683), Jun. 9-11, 2003, pp. 444-449.

Jayabalan, et al., "Dynamic Action Recognition: A convolutional neural network model for temporally organized joint location data," Cornell University, Computer Science, Dec. 20, 2016, 11 pages.

Longuet-Higgens, "A computer algorithm for reconstructing a scene from two projections," Nature 293, Sep. 10, 1981, pp. 133-135.

Redmon et al., "YOLO9000: Better, Faster, Stronger," (available at https://arxiv.org/pdf/1612.08242.pdf), Dec. 25, 2016, 9 pages.

Redmon et al., "You Only Look Once: Unified, Real-Time Object Detection," University of Washington, Allen Institute for Aly, Facebook AI Research, May 9, 2016, 10 pages.

Rossi et al., "Tracking and Counting Moving People," IEEE Int'l Conf. on Image Processing, ICIP-94, Nov. 13-16, 1994, 5 pages.

Symons, "Data Fusion Methods for Netted Sensors with Limited Communication Bandwidth", QinetiQ Ltd and University College London, 2004.

Toshev et al. "DeepPose: Human Pose Estimation via Deep Neural Networks," IEEE Conf. on Computer Vision and Pattern Recognition, Aug. 2014, 8 pages.

Vincze, "Robust tracking of ellipses at frame rate," Pattern Recognition, vol. 34, Issue 2, Feb. 2001, pp. 487-498.

Wei et al., "Convolutional Pose Machine", Proceedings of the IEEE conference on Computer Vision and Pattern Recognition, Jun. 27, 2016, pp. 4724-4732.

Zhang "A Flexible New Technique for Camera Calibration," IEEE Transactions on Pattern Analysis and Machine Intelligence, vol. 22, No. 11, Nov. 2000, 22pages.

\* cited by examiner

Perspective View of Shelf Unit B in Aisle 116a

```
Joint = {
    (x, y) position of joint,
    joint number (one of 19 possibilities, e.g., 1 = left-ankle, 2 = right-ankle),
    confidence number (describing how confident CNN is in its prediction),
    unique integer-ID for the joint
}
```

Joints data structure 400

FIG. 4

```
Subject = { Key   = frame_id
           Value = { Key   = camera_id
                    Value = Assigned joints to subject
                    [
                        [x of joint1, y of joint1, z of joint1],
                        [x of joint2, y of joint2, z of joint2],
                        ........
                        ........
                        [x of joint18, y of joint18, z of joint18],
                    ]
                  }
         }
```

Subject Data Structure 500

FIG. 5

DIRECTIONAL IMPRESSION ANALYSIS USING DEEP LEARNING

PRIORITY APPLICATION

This application is a continuation of U.S. patent application Ser. No. 17/089,012 filed 4 Nov. 2020 which is a continuation of U.S. patent application Ser. No. 16/388,772 filed 18 Apr. 2019 which claims the benefit of U.S. Provisional Patent Application No. 62/703,785 filed 26 Jul. 2018. U.S. patent application Ser. No. 16/388,772 is a continuation-in-part of U.S. patent application Ser. No. 15/945,473 filed 4 Apr. 2018, now U.S. Pat. No. 10,474,988 issued 12 Nov. 2019 which is a continuation-in-part of U.S. application Ser. No. 15/907,112, filed 27 Feb. 2018, now U.S. Pat. No. 10,133,933, issued 20 Nov. 2018, which is a continuation-in-part of U.S. patent application Ser. No. 15/847,796, filed 19 Dec. 2017, now U.S. Pat. No. 10,055,853, issued 21 Aug. 2018, which claims benefit of U.S. Provisional Patent Application No. 62/542,077 filed 7 Aug. 2017. All applications listed are incorporated herein by reference.

BACKGROUND

Field

The present invention relates to systems that track subjects in an area of real space.

Description of Related Art

Manufacturers, distributors, and shopping store management are interested to know the level of interest of shoppers in items in a shopping store. One way to determine this interest is by the number of items sold in a period of time. However, there are many items that shoppers do not purchase or even not pick up from shelves during their trip to the shopping store. Manufacturers and distributors of such items and the shopping store management are interested to know which items are getting more attention from shoppers even if the shoppers are not purchasing them. This data can provide useful insights for product design, pricing and marketing strategies. Traditional point of sale systems in shopping stores cannot provide this information.

It is desirable to provide a system that can more effectively and automatically provide the data related to interest of shoppers in different items located at multiple locations in the shopping store.

SUMMARY

A first system, and method for operating a system, are provided for detecting gaze directions of subjects, in an area of real space. The system is coupled to a plurality of cameras and to memory storing locations of items in the area of real space. The system includes processing logic that uses the sequences of frames of corresponding fields of view in the real space. The system includes logic that uses sequences of frames in a plurality of sequences of frames to identify locations of an identified subject and gaze directions of the subject in the area of real space over time. The system includes logic to access the database identifying locations of items in the area of real space. The system identifies items in the area of real space matching the identified gaze directions of the identified subject.

In one embodiment, the processing system includes logic that calculates distances of the identified subject from items having locations matching the identified gaze directions and stores the calculated distances. The system includes logic that determines lengths of time for which the subject maintains respective gaze directions and stores the lengths of times. The system includes logic that stores information including subject identifiers and item identifiers for the identified gaze directions.

In one embodiment, the system includes logic that uses sequences of frames in a plurality of sequences of frames to identify locations of the identified subject and gaze directions. The system includes image recognition engines which process the sequences of frames to generate corresponding arrays of joint data structures. The image recognition engines identify sets of joints as subjects in the real space. The system includes logic that uses joints in the set of joints to determine the gaze directions of the subject.

In one embodiment, the system that uses sequences of frames in a plurality of sequences of frames to identify locations of an identified subject and gaze directions of the identified subject further includes the logic that defines gaze directions as planes orthogonal to a floor in the area of real space. The plane include a vector corresponding to the gaze direction of the identified subject. In such an embodiment, the logic that identifies items in the area of real space matching the identified gaze directions of the subject identifies items mapped to inventory locations intersected by the plane. In one embodiment, the plane orthogonal to the floor includes a plurality of vectors respectively positioned at increasing distance from the floor.

The system can include inventory display structures in the area of real space. The inventory display structures comprise inventory locations matched with cells in the area of real space. The mapping of inventory locations with cells in the area of real space is stored in a database. In one embodiment, this is referred to as a maps database. The database identifies inventory locations of items in the area of real space with cells in the area of real space.

In one embodiment, the processing system includes logic to accumulate a plurality of data sets each including locations of the identified subject, gaze directions of the subject, items in area of real space matching the identified gaze directions, distances of identified subjects from items, the determined lengths of times. The system can store the accumulated data sets in the database configured for use to analyze the data to correlate a particular element of a plurality of data sets with other elements in the plurality of data sets related to the particular element.

In one embodiment, the system includes logic to correlate a particular item of a plurality of data sets with identified subjects in the plurality of data sets related to the particular item. The system can display the correlations on a user interface. For example, the system can display on a user interface a graphical construct indicating correlations of the particular item to the plurality of identified subjects in multiple locations in the area of real space.

The system can include logic that correlates the particular item of the plurality of data sets with identified subjects in the plurality of data sets related to the particular item and determine a count of the identified subjects related to the particular item. The system can display the count on the user interface display. The system can also graphically illustrate the locations in the area of real space where the item is located for example by showing inventory display structures and indicate the count on the graphical illustration.

The system can include logic to correlate a particular identified subject of the plurality of data sets with items in the plurality of data sets related to the particular subject. The system can display on a user interface a graphical construct indicating the lengths time for which items are in the gaze directions of the particular identified subject.

Methods and computer program products which can be executed by computer systems are also described herein.

Computer program products (or computer readable media) implementations of the technology disclosed can include may include one or more non-transitory computer readable storage media storing computer program instructions executable by one or more processors to detect gaze direction of subjects in an area of real space. The computer program instructions when executed on one or more processors implement the method including receiving a plurality of sequences of frames of corresponding fields of view in the real space. The method includes identifying locations of an identified subject and gaze directions of the subject in the area of real space over time using sequences of frames in the plurality of sequences of frames. The method includes identifying items in the area of real space matching the identified gaze directions of the identified subject.

Each of the features discussed in this section for the system implementation apply equally to this computer readable media (CRM) implementation. As indicated above, all the system features are not repeated here and should be considered repeated by reference.

A second system, and method for operating a system, are provided for detecting gaze directions of subjects, in an area of real space. The system is coupled to a processing system receiving a plurality of sequences of frames of corresponding fields of view in the real space. The system includes logic that uses sequences of frames in the plurality of sequences of frames to identify locations of the identified subject. The system includes logic that processes the sequences of frames to generate corresponding arrays of joint data structures and to identify sets of joints as subjects in the real space. The system uses joints in the sets of joints, to identify gaze directions of the subject. The system includes logic having access to a database identifying locations of items in the area of real space. The system includes logic that identifies items in the area of real space matching the identified gaze directions of the identified subject.

In one embodiment, the logic that uses joints in the sets of joints, to determine the gaze directions of the subject, includes logic to use neck and shoulder joints of the identified subject to determine the gaze directions of the subject. In one embodiment, the logic that uses joints in the sets of joints, to determine the gaze directions of the subject, includes logic that defines a vector corresponding to the gaze direction of the identified subjects as normal to a plane formed by neck and shoulder joints of the identified subject.

In one embodiment, the system further includes logic that defines gaze directions as planes orthogonal to a floor in the area of real space. The plane includes the vector corresponding to the gaze direction of the identified subject. In such embodiment, the system includes logic that identifies items in the area of real space matching the identified gaze directions of the subject identifies items mapped to inventory locations intersected by the plane.

Methods and computer program products which can be executed by computer systems are also described herein.

Functions described herein, including but not limited to detecting gaze directions of identified subjects present complex problems of computer engineering, relating for example to the type of image data to be processed, what processing of the image data to perform, and how to determine actions from the image data with high reliability.

Other aspects and advantages of the present invention can be seen on review of the drawings, the detailed description and the claims, which follow.

BRIEF DESCRIPTION OF THE DRAWINGS

FIG. 4 shows an example data structure for storing joints information of subjects.

FIG. 5 is an example data structure for storing a subject including the information of associated joints.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

System Overview

A system and various implementations of the subject technology is described with reference to FIGS. 1-10. The system and processes are described with reference to FIG. 1, an architectural level schematic of a system in accordance with an implementation. Because FIG. 1 is an architectural diagram, certain details are omitted to improve the clarity of the description.

Figure 1:
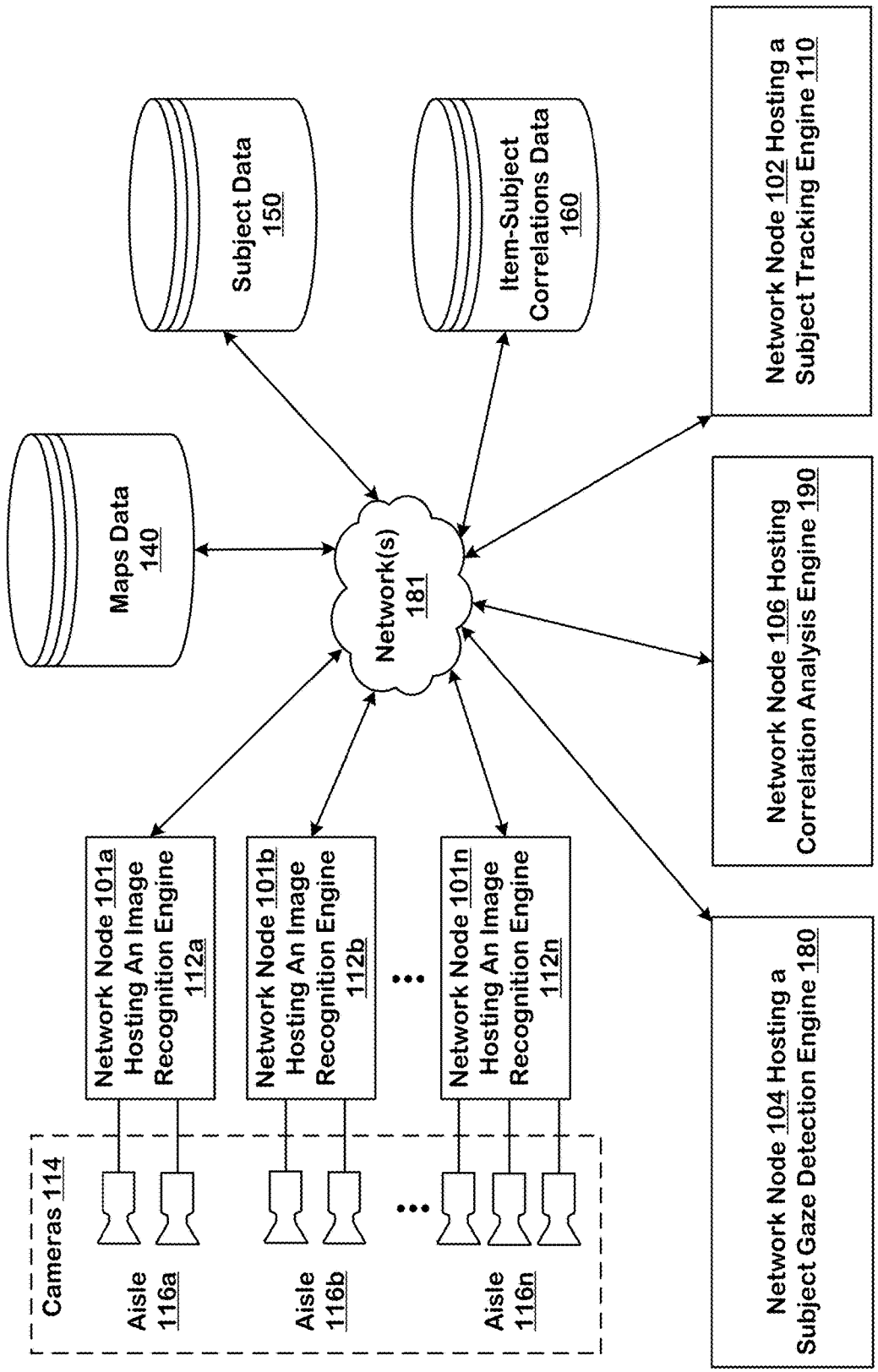
FIG. 1 illustrates an architectural level schematic of a system in which a subject gaze detection engine identifies gaze directions of identified subjects in an area of real space.

The discussion of FIG. 1 is organized as follows. First, the elements of the system are described, followed by their interconnections. Then, the use of the elements in the system is described in greater detail.

FIG. 1 provides a block diagram level illustration of a system 100. The system 100 includes cameras 114, network nodes hosting image recognition engines 112a, 112b, and 112n, a subject gaze detection engine 180 deployed in a network node 104 (or nodes) on the network, a correlation analysis engine 190 deployed in a network node 106 (or nodes) on the network, and a subject tracking engine 110 deployed in a network node 102 (or nodes) on the network. The network nodes can include or have access to memory supporting subject gaze detection, including in this example a maps database 140, a subjects database 150, an item-subject correlations database 160 and a communication network or networks 181. The network nodes can host only one image recognition engine, or several image recognition engines.

The embodiment described here uses cameras in the visible range which can generate, for example, RGB color output images. In other embodiments, different kinds of sensors are used to produce sequences of images. Examples of such sensors include, ultrasound sensors, thermal sensors, Lidar, etc., which are used to produce sequences of images of corresponding fields of view in the real space. In one embodiment, sensors can be used in addition to the cameras 114. Multiple sensors can be synchronized in time with each other, so that frames are captured by the sensors at the same time, or close in time, and at the same frame capture rate. All of the embodiments described herein can include sensors other than or in addition to cameras.

As used herein, a network node is an addressable hardware device or virtual device that is attached to a network, and is capable of sending, receiving, or forwarding information over a communications channel to or from other network nodes. Examples of electronic devices which can be deployed as hardware network nodes include all varieties of computers, workstations, laptop computers, handheld computers, and smartphones. Network nodes can be implemented in a cloud-based server system. More than one virtual device configured as a network node can be implemented using a single physical device.

The databases 140, 150, and 160 are stored on one or more non-transitory computer readable media. As used herein, no distinction is intended between whether a database is disposed "on" or "in" a computer readable medium. Additionally, as used herein, the term "database" does not necessarily imply any unity of structure. For example, two or more separate databases, when considered together, still constitute a "database" as that term is used herein. Thus in FIG. 1, the databases 140, 150, and 160 can be considered to be a single database.

For the sake of clarity, only three network nodes hosting image recognition engines are shown in the system 100. However, any number of network nodes hosting image recognition engines can be connected to the subject tracking engine 110 through the network(s) 181. Similarly, the image recognition engine, the subject gaze detection engine, the correlation analysis engine, the subject tracking engine, and other processing engines described herein can execute using more than one network node in a distributed architecture.

The interconnection of the elements of system 100 will now be described. Network(s) 181 couples the network nodes 101a, 101b, and 101n, respectively, hosting image recognition engines 112a, 112b, and 112n, the network node 104 hosting the subject gaze detection engine 180, the network node 102 hosting the subject tracking engine 110, the network node 106 hosting the correlation analysis engine 190, the maps database 140, the subjects database 150, the item-subject correlation database 160. Cameras 114 are connected to the subject tracking engine 110 through network nodes hosting image recognition engines 112a, 112b, and 112n. In one embodiment, the cameras 114 are installed in a shopping store such that sets of cameras 114 (two or more) with overlapping fields of view are positioned to capture images of real space in the store. In FIG. 1, two cameras are arranged over aisle 116a, two cameras are arranged over aisle 116b, and three cameras are arranged over aisle 116n. Cameras are installed over open spaces, aisles, and near exits and entrances to the shopping store. In such an embodiment, the cameras are configured with the goal that customers moving in the shopping store are present in the field of view of two or more cameras at any moment in time.

Cameras 114 can be synchronized in time with each other, so that images are captured at the image capture cycles at the same time, or close in time, and at the same image capture rate. The cameras 114 can send respective continuous streams of images at a predetermined rate to network nodes hosting image recognition engines 112a-112n. Images captured in all cameras covering an area of real space at the same time, or close in time, are synchronized in the sense that the synchronized images can be identified in the processing engines as representing different views of subjects having fixed positions in the real space. For example, in one embodiment, the cameras send image frames at the rates of 30 frames per second (fps) to respective network nodes hosting image recognition engines 112a-112n. Each frame has a timestamp, identity of the camera (abbreviated as "camera_id"), and a frame identity (abbreviated as "frame_id") along with the image data. As described above other embodiments of the technology disclosed can use different types of sensors such as image sensors, ultrasound sensors, thermal sensors, Lidar, etc.

Cameras are connected to respective image recognition engines. For example, in FIG. 1, the two cameras installed over the aisle 116a are connected to the network node 101a hosting an image recognition engine 112a. Likewise, the two cameras installed over aisle 116b are connected to the network node 101b hosting an image recognition engine 112b. Each image recognition engine 112a-112n hosted in a network node or nodes 101a-101n, separately processes the image frames received from one camera each in the illustrated example. In an embodiment of a subject tracking system described herein, cameras are installed overhead, so that in combination the fields of view of the cameras encompass an area of real space in which the tracking is to be performed, such as in a shopping store.

In one embodiment, each image recognition engine 112a, 112b, and 112n is implemented as a deep learning algorithm such as a convolutional neural network (abbreviated CNN). In such an embodiment, the CNN is trained using training database. In an embodiment described herein, image recognition of subjects in the real space is based on identifying and grouping features of the subjects such as joints, recognizable in the images, where the groups of joints can be attributed to an individual subject. For this joints-based analysis, the training database has a large collection of images for each of the different types of joints for subjects. In the example embodiment of a shopping store, the subjects are the customers moving in the aisles between the shelves. In an example embodiment, during training of the CNN, the system 100 is referred to as a "training system." After training the CNN using the training database, the CNN is switched to production mode to process images of customers in the shopping store in real time.

In an example embodiment, during production, the system 100 is referred to as a runtime system (also referred to as an inference system). The CNN in each image recognition engine produces arrays of joints data structures for images in its respective stream of images. In an embodiment as described herein, an array of joints data structures is produced for each processed image, so that each image recognition engine 112a-112n produces an output stream of arrays of joints data structures. These arrays of joints data structures from cameras having overlapping fields of view are further processed to form groups of joints, and to identify such groups of joints as subjects. The subjects can be tracked by the system using a tracking identifier "tracking_id" during their presence in the area of real space. The tracked subjects can be saved in the subjects database 150.

The subject tracking engine 110, hosted on the network node 102 receives, in this example, continuous streams of arrays of joints data structures for the subjects from image recognition engines 112a-112n. The subject tracking engine 110 processes the arrays of joints data structures identified from the sequences of images received from the cameras at image capture cycles. It then translates the coordinates of the elements in the arrays of joints data structures corresponding to images in different sequences into candidate joints having coordinates in the real space. For each set of synchronized images, the combination of candidate joints identified throughout the real space can be considered, for the purposes of analogy, to be like a galaxy of candidate joints. For each succeeding point in time, movement of the candidate joints is recorded so that the galaxy changes over time. The output of the subject tracking engine 110 is used to locate subjects in the area of real space during identification intervals. In one embodiment, one image in each of the plurality of sequences of images, produced by cameras, is captured in each image capture cycle, and identification intervals correspond with the image capture cycles. In another embodiment, the identification interval comprises more than one image capture cycles.

The subject tracking engine 110 uses logic to determine groups or sets of candidate joints having coordinates in real space as subjects in the real space. For the purposes of analogy, each set of candidate points is like a constellation of candidate joints at each point in time. In one embodiment, these constellations of joints are generated per identification interval as representing a located subject. Subjects are located during an identification interval using the constellation of joints. The constellations of candidate joints can move over time. A time sequence analysis of the output of the subject tracking engine 110 over a period of time, such as over multiple temporally ordered identification intervals, identifies movements of subjects in the area of real space. The system can store the subject data including unique identifiers, joints and their locations in the real space in the subject database 150.

In an example embodiment, the logic to identify sets of candidate joints (i.e. constellations) as representing a located subject comprises heuristic functions based on physical relationships amongst joints of subjects in real space. These heuristic functions are used to locate sets of candidate joints as subjects. The sets of candidate joints comprise individual candidate joints that have relationships according to the heuristic parameters with other individual candidate joints and subsets of candidate joints in a given set that has been located, or can be located, as an individual subject.

In the example of a shopping store the customers (also referred to as subjects above) move in the aisles and in open spaces. The customers can take items from inventory locations on shelves in inventory display structures. The customers can also put items back on the same shelves from where they were taken or on another shelf. In one example of inventory display structures, shelves are arranged at different levels (or heights) from the floor and inventory items are stocked on the shelves. The shelves can be fixed to a wall or placed as freestanding shelves forming aisles in the shopping store. Other examples of inventory display structures include, pegboard shelves, magazine shelves, lazy susan shelves, warehouse shelves, and refrigerated shelving units. The inventory items can also be stocked in other types of inventory display structures such as stacking wire baskets, dump bins, etc.

As a subject moves in the shopping store, she can stop at a location in the shopping store to look at one or more items. The subject may not interact with the item such as by taking the item from the shelf. The subject gaze detection engine 180 can identify gaze directions of the subject. The gaze direction of the subject is the direction in which the subject is looking while stationary at the identified location in the area of real space. In one embodiment, the gaze direction of the subject can be along a 2D vector corresponding to the gaze direction of the subject. In one embodiment, the 2D vector is parallel to the floor (x-y plane) of the real space at a height close to the neck joint of the subject.

The locations of items in the area of real space can be stored in the maps database 140. The system can include or have access to memory (such as maps database 140) storing a planogram identifying inventory locations in the area of real space and items to be stocked on inventory locations. The planogram can also include information about portions of inventory locations designated for particular inventory items. The planogram can be produced based on a plan for the arrangement of inventory items on the inventory locations in the area of real space. In another embodiment, the system can generate and store in memory a data structure referred to herein as a "realogram," identifying the locations of inventory items in the area of real space based on accumulation of data about the items identified in, and the locations of, the inventory events detected. The details of generation and use of realogram are presented in U.S. application Ser. No. 16/256,355, filed 24 Jan. 2019, titled, "Deep Learning-Based Store Realograms" which is incorporated herein by reference as if fully set forth herein. The system can identify items that are positioned at inventory locations in the area of real space that intersect with the vector corresponding to the gaze direction of the subject. The identified items are in the gaze direction of the subject.

It is understood that subjects can look at items above or below the items having locations matching the intersection of a vector, corresponding to the gaze direction of the subject, with the inventory locations. This range of variation in identified gaze direction of the subject is small enough to be considered the same gaze direction. The identified subject can stand at the same location in the area of real space and can look at items located above or below the items having locations matching the intersection of a vector corresponding to the gaze direction with the inventory locations without changing the orientation and moving the position of the head. Therefore, to accommodate these small variations in the gaze direction, the subject gaze detection engine 180 identifies a column of real space in the field of view of the subject that intersects the 2D vector corresponding to the gaze direction of the subject.

The subject gaze detection engine uses the subject data from the subject database 150 to identify gaze directions of the subject. The subject gaze detection engine can also identify locations of items in the area of real space that match the identified gaze directions of the identified subject. The subject and item correlation data can be saved in item-subject correlations database 160. The system can accumulate a plurality of data sets in the database each including locations of identified subjects, gaze directions of the subject, items in the area of real space matching identified gaze directions, and distances of identified subjects from items, and the determined lengths of times. The correlation analysis engine 190 can access the item-subject correlations analysis database to analyze the data stored in the item-subject correlations database 160 to correlate a particular element of a plurality of data sets with other elements in the plurality of data sets related to the particular element.

In one embodiment, the image analysis is anonymous, i.e., a unique tracking identifier assigned to a subject created through joints analysis does not identify personal identification details (such as names, email addresses, mailing addresses, credit card numbers, bank account numbers, driver's license number, etc.) of any specific subject in the real space. The data stored in the subjects database 150 does not include any personal identification information. The operations of the subject persistence processing engine 180 and the subject tracking engine 110 do not use any personal identification including biometric information associated with the subjects.

In one embodiment, the image analysis to locate and track subjects includes identification of facial features of the subjects. The facial features can include eyes (left eye, and right eye), ears (left ear, and right ear), nose, mouth and top of head of subjects. In this embodiment, the image recognition engines are trained to identify facial features of the subjects in the sequences of images received from cameras 114. The facial features can be used to locate the subjects and detect their orientations. The facial features can be used to determine gaze directions in which a subject is looking by using positions of the facial features of the subject in area of real space. In another embodiment, the joints analysis and feature detection can be used in combination to detect gaze directions of subjects.

In one embodiment, the tracked subjects are identified by linking them to respective "user accounts" containing for example preferred payment method provided by the subject. When linked to a user account, a tracked subject is characterized herein as an identified subject. Tracked subjects are linked with items picked up in the store, and linked with a user account, for example, and upon exiting the store, an invoice can be generated and delivered to the identified subject, or a financial transaction executed online to charge the identified subject using the payment method associated to their accounts. The identified subjects can be uniquely identified, for example, by unique account identifiers or subject identifiers, etc. In the example of a cashier-less store, as the customer completes shopping by taking items from the shelves, the system processes payment of items bought by the customer.

The actual communication path to the network nodes 104 hosting the subject gaze detection engine 180, the network node 106 hosting the correlation analysis engine 190, and the network node 102 hosting the subject tracking engine 110, through the network 181 can be point-to-point over public and/or private networks. The communications can occur over a variety of networks 181, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as a LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™ Truviso™, Amazon Elasticsearch Service™, Amazon Web Services™ (AWS), IBM Info-Sphere™, Borealis™, and Yahoo! S4™.

Camera Arrangement

The cameras 114 are arranged to track subjects (or entities) in a three dimensional (abbreviated as 3D) real space. In the example embodiment of the shopping store, the real space can include the area of the shopping store where items for sale are stacked in shelves. A point in the real space can be represented by an (x, y, z) coordinate system. Each point in the area of real space for which the system is deployed is covered by the fields of view of two or more cameras 114.

Figure 2A:
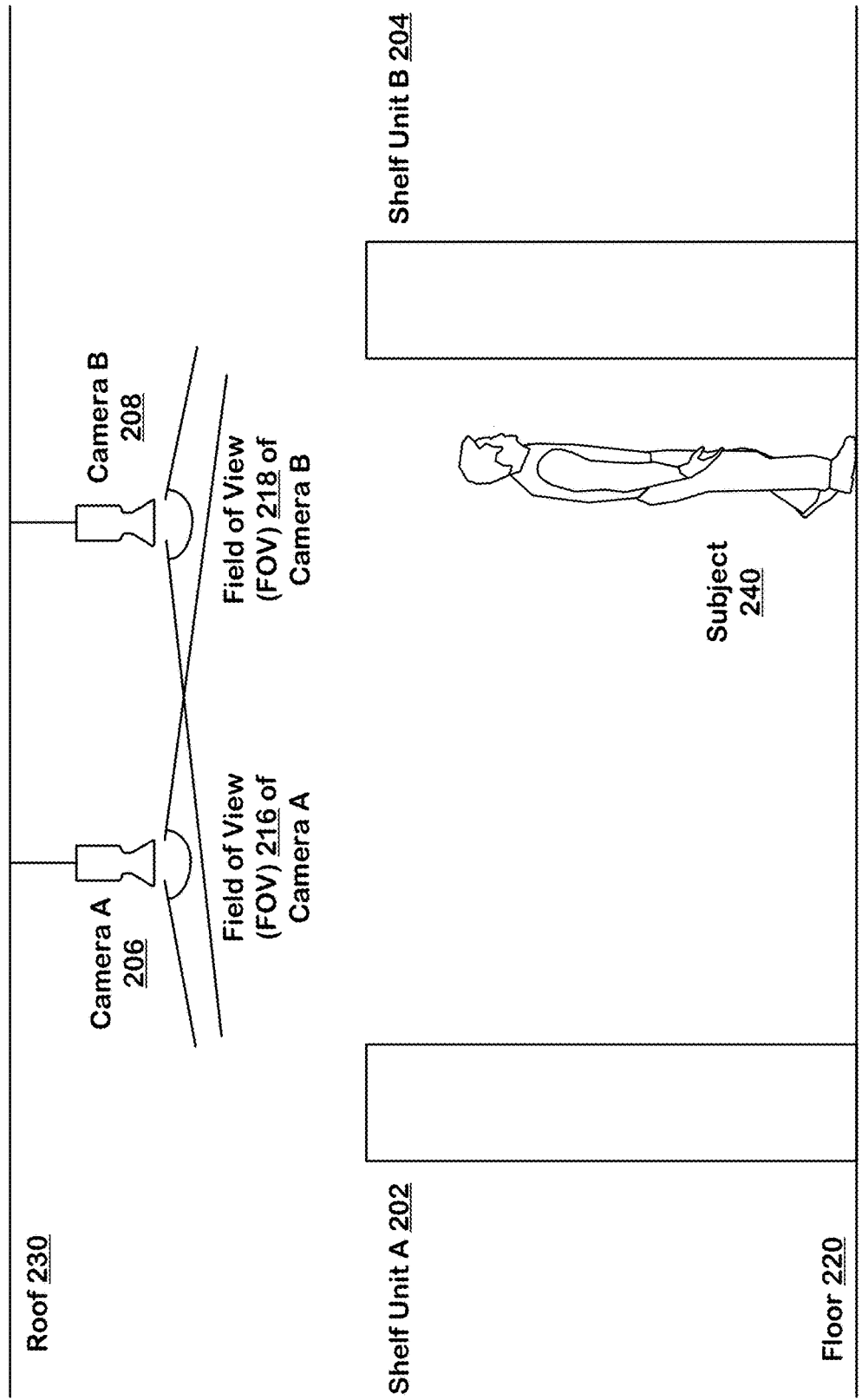
FIG. 2A is a side view of an aisle in a shopping store illustrating a subject, inventory display structures and a camera arrangement in a shopping store.

In a shopping store, the shelves and other inventory display structures can be arranged in a variety of manners, such as along the walls of the shopping store, or in rows forming aisles or a combination of the two arrangements. FIG. 2A shows an arrangement of shelf unit A 202 and shelf unit B 204, forming an aisle 116a, viewed from one end of the aisle 116a. Two cameras, camera A 206 and camera B 208 are positioned over the aisle 116a at a predetermined distance from a roof 230 and a floor 220 of the shopping store above the inventory display structures, such as shelf units A 202 and shelf unit B 204. The cameras 114 comprise cameras disposed over and having fields of view encompassing respective parts of the inventory display structures and floor area in the real space. For example, the field of view 216 of camera A 206 and field of view 218 of camera B 208 overlap as shown in FIG. 2A. The locations of subjects are represented by their positions in three dimensions of the area of real space. In one embodiment, the subjects are represented as constellation of joints in real space. In this embodiment, the positions of the joints in the constellation of joint are used to determine the location of a subject in the area of real space.

In the example embodiment of the shopping store, the real space can include the entire floor 220 in the shopping store. Cameras 114 are placed and oriented such that areas of the floor 220 and shelves can be seen by at least two cameras. The cameras 114 also cover floor space in front of the shelves 202 and 204. Camera angles are selected to have both steep perspective, straight down, and angled perspectives that give more full body images of the customers. In one example embodiment, the cameras 114 are configured at an eight (8) foot height or higher throughout the shopping store.

Figure 2B:
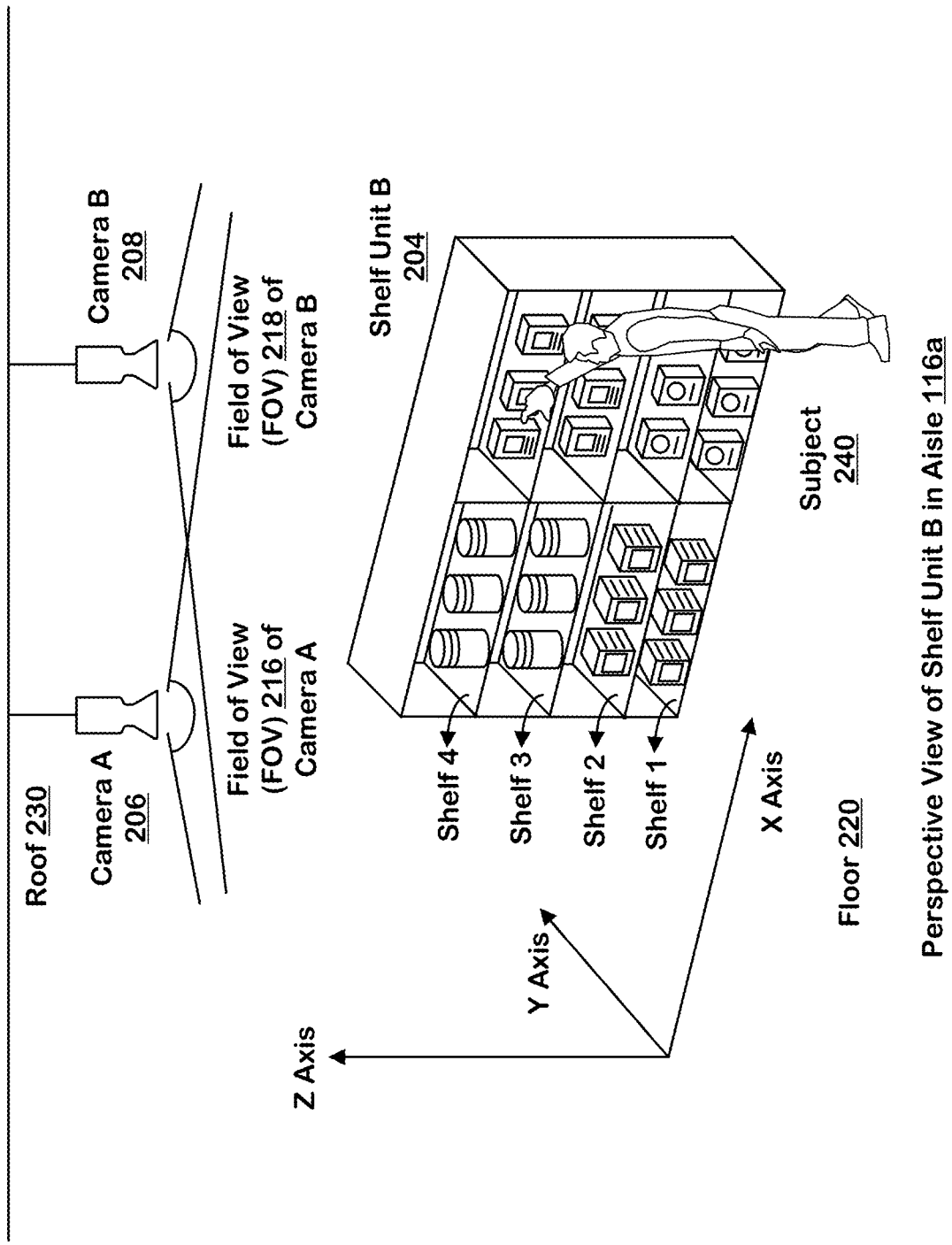
FIG. 2B is a perspective view, illustrating a subject positioned in front of a shelf in the inventory display structure in the area of real space

In FIG. 2A, a subject 240 is standing by an inventory display structure shelf unit B 204, and looking at items located in the shelf unit B. FIG. 2B is a perspective view of the shelf unit B 204 with four shelves, shelf 1, shelf 2, shelf 3, and shelf 4 positioned at different levels from the floor. The inventory items are stocked on the shelves.

Three Dimensional Scene Generation

A location in the real space is represented as a (x, y, z) point of the real space coordinate system. "x" and "y" represent positions on a two-dimensional (2D) plane which can be the floor 220 of the shopping store. The value "z" is the height of the point above the 2D plane at floor 220 in one configuration. The system combines 2D images from two or more cameras to generate the three dimensional positions of joints in the area of real space. This section presents a description of the process to generate 3D coordinates of joints. The process is also referred to as 3D scene generation.

Before using the system 100 in training or inference mode to track the inventory items, two types of camera calibrations: internal and external, are performed. In internal calibration, the internal parameters of the cameras 114 are calibrated. Examples of internal camera parameters include focal length, principal point, skew, fisheye coefficients, etc. A variety of techniques for internal camera calibration can be used. One such technique is presented by Zhang in "A flexible new technique for camera calibration" published in IEEE Transactions on Pattern Analysis and Machine Intelligence, Volume 22, No. 11, November 2000.

In external calibration, the external camera parameters are calibrated in order to generate mapping parameters for translating the 2D image data into 3D coordinates in real space. In one embodiment, one subject (also referred to as a multi-joint subject), such as a person, is introduced into the real space. The subject moves through the real space on a path that passes through the field of view of each of the cameras 114. At any given point in the real space, the subject is present in the fields of view of at least two cameras forming a 3D scene. The two cameras, however, have a different view of the same 3D scene in their respective two-dimensional (2D) image planes. A feature in the 3D scene such as a left-wrist of the subject is viewed by two cameras at different positions in their respective 2D image planes.

A point correspondence is established between every pair of cameras with overlapping fields of view for a given scene. Since each camera has a different view of the same 3D scene, a point correspondence is two pixel locations (one location from each camera with overlapping field of view) that represent the projection of the same point in the 3D scene. Many point correspondences are identified for each 3D scene using the results of the image recognition engines 112a to 112n for the purposes of the external calibration. The image recognition engines identify the position of a joint as (x, y) coordinates, such as row and column numbers, of pixels in the 2D image space of respective cameras 114. In one embodiment, a joint is one of 19 different types of joints of the subject. As the subject moves through the fields of view of different cameras, the tracking engine 110 receives (x, y) coordinates of each of the 19 different types of joints of the subject used for the calibration from cameras 114 per image.

For example, consider an image from a camera A and an image from a camera B both taken at the same moment in time and with overlapping fields of view. There are pixels in an image from camera A that correspond to pixels in a synchronized image from camera B. Consider that there is a specific point of some object or surface in view of both camera A and camera B and that point is captured in a pixel of both image frames. In external camera calibration, a multitude of such points are identified and referred to as corresponding points. Since there is one subject in the field of view of camera A and camera B during calibration, key joints of this subject are identified, for example, the center of left wrist. If these key joints are visible in image frames from both camera A and camera B then it is assumed that these represent corresponding points. This process is repeated for many image frames to build up a large collection of corresponding points for all pairs of cameras with overlapping fields of view. In one embodiment, images are streamed off of all cameras at a rate of 30 FPS (frames per second) or more and a resolution of 720 pixels in full RGB (red, green, and blue) color. These images are in the form of one-dimensional arrays (also referred to as flat arrays).

The large number of images collected above for a subject is used to determine corresponding points between cameras with overlapping fields of view. Consider two cameras A and B with overlapping field of view. The plane passing through camera centers of cameras A and B and the joint location (also referred to as feature point) in the 3D scene is called the "epipolar plane". The intersection of the epipolar plane with the 2D image planes of the cameras A and B defines the "epipolar line". Given these corresponding points, a transformation is determined that can accurately map a corresponding point from camera A to an epipolar line in camera B's field of view that is guaranteed to intersect the corresponding point in the image frame of camera B. Using the image frames collected above for a subject, the transformation is generated. It is known in the art that this transformation is non-linear. The general form is furthermore known to require compensation for the radial distortion of each camera's lens, as well as the non-linear coordinate transformation moving to and from the projected space. In external camera calibration, an approximation to the ideal non-linear transformation is determined by solving a non-linear optimization problem. This non-linear optimization function is used by the subject tracking engine 110 to identify the same joints in outputs (arrays of joint data structures) of different image recognition engines 112a to 112n, processing images of cameras 114 with overlapping fields of view. The results of the internal and external camera calibration are stored in a calibration database.

A variety of techniques for determining the relative positions of the points in images of cameras 114 in the real space can be used. For example, Longuet-Higgins published, "A computer algorithm for reconstructing a scene from two projections" in Nature, Volume 293, 10 Sep. 1981. This paper presents computing a three-dimensional structure of a scene from a correlated pair of perspective projections when spatial relationship between the two projections is unknown. Longuet-Higgins paper presents a technique to determine the position of each camera in the real space with respect to other cameras. Additionally, their technique allows triangulation of a subject in the real space, identifying the value of the z-coordinate (height from the floor) using images from cameras 114 with overlapping fields of view. An arbitrary point in the real space, for example, the end of a shelf unit in one corner of the real space, is designated as a (0, 0, 0) point on the (x, y, z) coordinate system of the real space.

In an embodiment of the technology, the parameters of the external calibration are stored in two data structures. The first data structure stores intrinsic parameters. The intrinsic parameters represent a projective transformation from the 3D coordinates into 2D image coordinates. The first data structure contains intrinsic parameters per camera as shown below. The data values are all numeric floating point numbers. This data structure stores a 3×3 intrinsic matrix, represented as "K" and distortion coefficients. The distortion coefficients include six radial distortion coefficients and two tangential distortion coefficients. Radial distortion occurs when light rays bend more near the edges of a lens than they do at its optical center. Tangential distortion occurs when the lens and the image plane are not parallel. The following data structure shows values for the first camera only. Similar data is stored for all the cameras 114.

```
{
  1: {
    K: [[x, x, x], [x, x, x], [x, x, x]],
    distortion_coefficients: [x, x, x, x, x, x, x, x]
  },
}
```

The second data structure stores per pair of cameras: a 3×3 fundamental matrix (F), a 3×3 essential matrix (E), a 3×4 projection matrix (P), a 3×3 rotation matrix (R) and a 3×1 translation vector (t). This data is used to convert points in one camera's reference frame to another camera's reference frame. For each pair of cameras, eight homography coefficients are also stored to map the plane of the floor 220 from one camera to another. A fundamental matrix is a relationship between two images of the same scene that constrains where the projection of points from the scene can occur in both images. Essential matrix is also a relationship between two images of the same scene with the condition that the cameras are calibrated. The projection matrix gives a vector space projection from 3D real space to a subspace. The rotation matrix is used to perform a rotation in Euclidean space. Translation vector "t" represents a geometric transformation that moves every point of a figure or a space by the same distance in a given direction. The homography_floor_coefficients are used to combine images of features of subjects on the floor 220 viewed by cameras with overlapping fields of views. The second data structure is shown below. Similar data is stored for all pairs of cameras. As indicated previously, the x's represents numeric floating point numbers.

```
{
  1: {
    2: {
      F: [[x, x, x], [x, x, x], [x, x, x]],
      E: [[x, x, x], [x, x, x], [x, x, x]],
      P: [[x, x, x, x], [x, x, x, x], [x, x, x, x]],
      R: [[x, x, x], [x, x, x], [x, x, x]],
```

-continued

```
      t: [x, x, x],
      homography_floor_coefficients: [x, x, x, x, x, x, x, x]
    }
  },
  .......
}
```

Two Dimensional and Three Dimensional Maps

Figure 3A:
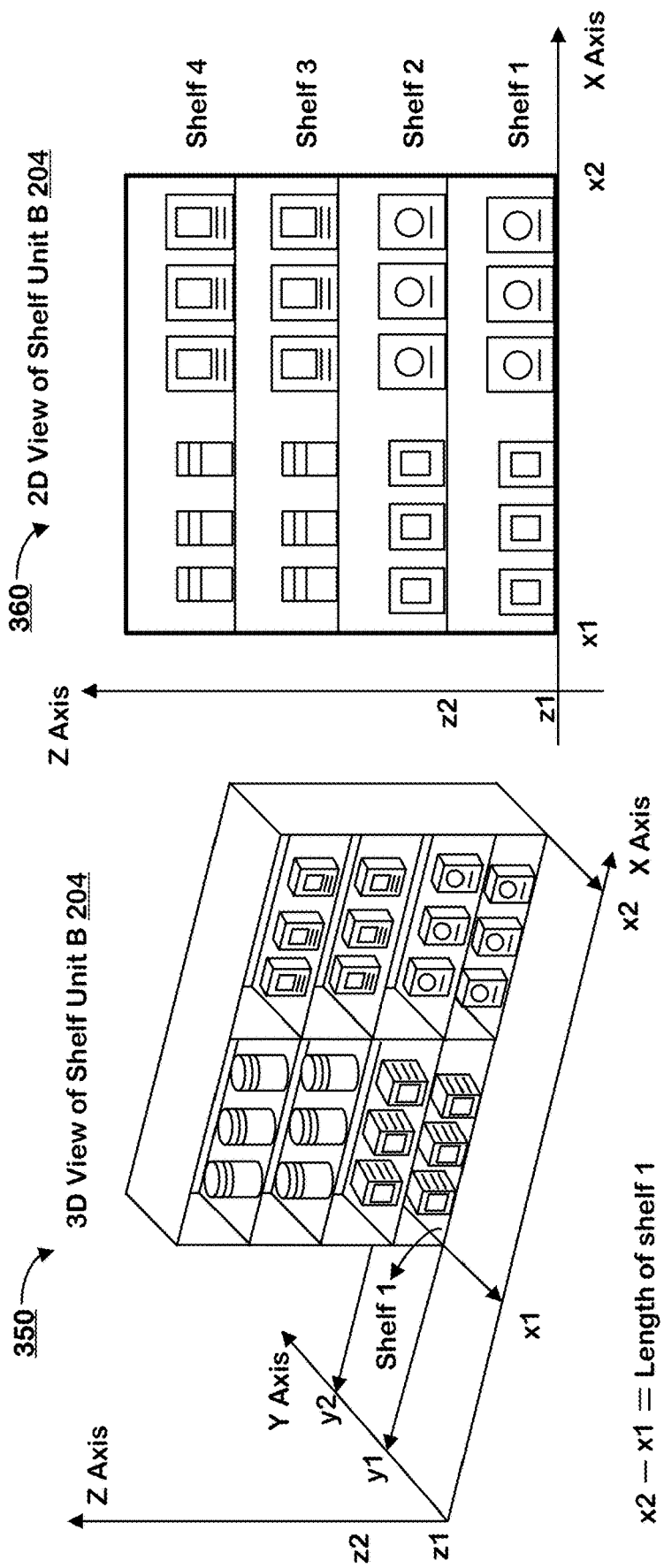
FIG. 3A shows examples of 2D and 3D maps of a shelf in an inventory display structure.

An inventory location, such as a shelf, in a shopping store can be identified by a unique identifier in a map database (e.g., shelf_id). Similarly, a shopping store can also be identified by a unique identifier (e.g., store_id) in a map database. The two dimensional (2D) and three dimensional (3D) maps database 140 identifies inventory locations in the area of real space along the respective coordinates. For example, in a 2D map, the locations in the maps define two dimensional regions on the plane formed perpendicular to the floor 220 i.e., XZ plane as shown in graphical illustration 360 in FIG. 3A. The map defines an area for inventory locations where inventory items are positioned. In FIG. 3A, a 2D location of the shelf unit shows an area formed by four coordinate positions (x1, y1), (x1, y2), (x2, y2), and (x2, y1). These coordinate positions define a 2D region on the floor 220 where the shelf is located. Similar 2D areas are defined for all inventory display structure locations, entrances, exits, and designated unmonitored locations in the shopping store. A front facing 2D map (on X-Z plane) of inventory structure is shown in the graphical illustration 360. In this 2D view of inventory locations, a front view of shelf 1 is an area formed by four coordinate positions (x1, z1), (x1, z2), (x2, z2), and (x2, z1). Similar, 2D areas are defined for front views of all shelves in all shelf units in the area of real space. The 2D maps of the area of real space are stored in the maps database 140.

In a 3D map, the locations in the map define three dimensional regions in the 3D real space defined by X, Y, and Z coordinates as shown in the illustration 350. The map defines a volume for inventory locations where inventory items are positioned. In FIG. 3A, a 3D view 350 of shelf 1 in the shelf unit B 204 shows a volume formed by eight coordinate positions (x1, y1, z1), (x1, y1, z2), (x1, y2, z1), (x1, y2, z2), (x2, y1, z1), (x2, y1, z2), (x2, y2, z1), (x2, y2, z2) defining a 3D region in which inventory items are positioned on the shelf 1. Similar 3D regions are defined for inventory locations in all shelf units in the shopping store and stored as a 3D map of the real space (shopping store) in the maps database 140. The coordinate positions along the three axes can be used to calculate length, depth and height of the inventory locations as shown in FIG. 3A.

In one embodiment, the map identifies a configuration of units of volume which correlate with portions of inventory locations on the inventory display structures in the area of real space. Each portion is defined by starting and ending positions along the three axes of the real space. Like 2D maps, the 3D maps can also store locations of all inventory display structure locations in the shopping store.

The items in a shopping store are arranged in some embodiments according to a planogram which identifies the inventory locations (such as shelves) on which a particular item is designated to be placed. For example, as shown in an illustration 350 in FIG. 3A, a left half portion of shelf 3 and shelf 4 are designated for an item (which is stocked in the form of cans).

Figure 3B:
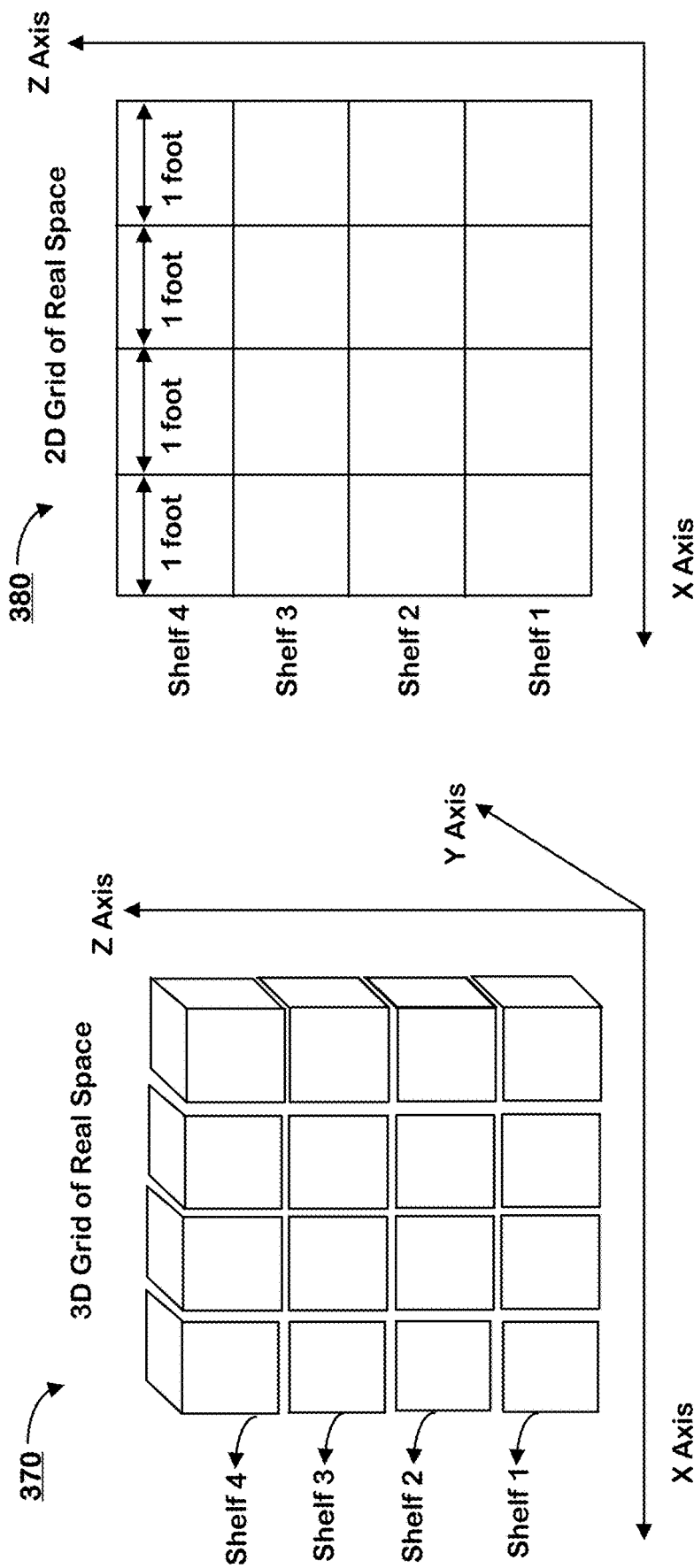
FIG. 3B illustrates discretization of shelves in portions in inventory display structure of FIG. 3A using two dimensional (2D) and three dimensional (3D) grids.

In an embodiment, the system or method can create a data set defining a plurality of cells having coordinates in the area of real space. The system or method can divide the real space into a data set defining a plurality of cells using the length of the cells along the coordinates of the real space as an input parameter. In one embodiment, the cells are represented as two dimensional grids having coordinates in the area of real space. For example, the cells can correlate with 2D grids (e.g. at 1 foot spacing) of front plan of inventory locations in shelf units (also referred to as inventory display structures) as shown in the illustration 380 in FIG. 3B. Each grid is defined by its starting and ending positions on the coordinates of the two dimensional plane such as x and z coordinates as shown in FIG. 3B. The 2D grids in 380 can be mapped to the shelves inventory display structure in illustration 360 in FIG. 3A, thus identifying items in each grid. This 2D girds information is stored in maps database 140.

In another embodiment, the cells are represented as three dimensional (3D) grids having coordinates in the area of real space. In one example, the cells can correlate with volume on inventory locations (or portions of inventory locations) in shelf units in the shopping store as shown in illustration 370 in FIG. 3B. In this embodiment, the map of the real space identifies a configuration of units of volume which can correlate with portions of inventory locations on inventory display structures in the area of real space. The cells in the 3D grids when mapped to the inventory locations can identify items having location matching the 3D grids. This information is stored in maps database 140.

Joints Data Structure

The image recognition engines 112a-112n receive the sequences of images from cameras 114 and process images to generate corresponding arrays of joints data structures. The system includes processing logic that uses the sequences of images produced by the plurality of camera to track locations of a plurality of subjects (or customers in the shopping store) in the area of real space. In one embodiment, the image recognition engines 112a-112n identify one of the 19 possible joints of a subject at each element of the image, usable to identify subjects in the area who may be moving in the area of real space, standing and looking at an inventory item, or taking and putting inventory items. The possible joints can be grouped in two categories: foot joints and non-foot joints. The 19$^{th}$ type of joint classification is for all non-joint features of the subject (i.e. elements of the image not classified as a joint). In other embodiments, the image recognition engine may be configured to identify the locations of hands specifically. Also, other techniques, such as a user check-in procedure or biometric identification processes, may be deployed for the purposes of identifying the subjects and linking the subjects with detected locations of their hands as they move throughout the store.

Foot Joints:
  Ankle joint (left and right)
Non-foot Joints:
  Neck
  Nose
  Eyes (left and right)
  Ears (left and right)
  Shoulders (left and right)
  Elbows (left and right)
  Wrists (left and right)
  Hip (left and right)
  Knees (left and right)
Not a joint An array of joints data structures for a particular image classifies elements of the particular image by joint type, time of the particular image, and the coordinates of the elements in the particular image. In one embodiment, the image recognition engines 112a-112n are convolutional neural networks (CNN), the joint type is one of the 19 types of joints of the subjects, the time of the particular image is the timestamp of the image generated by the source camera 114 for the particular image, and the coordinates (x, y) identify the position of the element on a 2D image plane.

The output of the CNN is a matrix of confidence arrays for each image per camera. The matrix of confidence arrays is transformed into an array of joints data structures. A joints data structure 400 as shown in FIG. 4 is used to store the information of each joint. The joints data structure 400 identifies x and y positions of the element in the particular image in the 2D image space of the camera from which the image is received. A joint number identifies the type of joint identified. For example, in one embodiment, the values range from 1 to 19. A value of 1 indicates that the joint is a left ankle, a value of 2 indicates the joint is a right ankle and so on. The type of joint is selected using the confidence array for that element in the output matrix of CNN. For example, in one embodiment, if the value corresponding to the left-ankle joint is highest in the confidence array for that image element, then the value of the joint number is "1".

A confidence number indicates the degree of confidence of the CNN in predicting that joint. If the value of confidence number is high, it means the CNN is confident in its prediction. An integer-Id is assigned to the joints data structure to uniquely identify it. Following the above mapping, the output matrix of confidence arrays per image is converted into an array of joints data structures for each image. In one embodiment, the joints analysis includes performing a combination of k-nearest neighbors, mixture of Gaussians, and various image morphology transformations on each input image. The result comprises arrays of joints data structures which can be stored in the form of a bit mask in a ring buffer that maps image numbers to bit masks at each moment in time.

Subject Tracking Engine

The tracking engine 110 is configured to receive arrays of joints data structures generated by the image recognition engines 112a-112n corresponding to images in sequences of images from cameras having overlapping fields of view. The arrays of joints data structures per image are sent by image recognition engines 112a-112n to the tracking engine 110 via the network(s) 181. The tracking engine 110 translates the coordinates of the elements in the arrays of joints data structures from 2D image space corresponding to images in different sequences into candidate joints having coordinates in the 3D real space. A location in the real space is covered by the field of views of two or more cameras. The tracking engine 110 comprises logic to determine sets of candidate joints having coordinates in real space (constellations of joints) as located subjects in the real space. In one embodiment, the tracking engine 110 accumulates arrays of joints data structures from the image recognition engines for all the cameras at a given moment in time and stores this information as a dictionary in a subject database, to be used for identifying a constellation of candidate joints corresponding to located subjects. The dictionary can be arranged in the form of key-value pairs, where keys are camera ids and values are arrays of joints data structures from the camera. In such an embodiment, this dictionary is used in heuristics-based analysis to determine candidate joints and for assignment of joints to located subjects. In such an embodiment, a high-level input, processing and output of the tracking engine 110 is illustrated in table 1. Details of the logic applied by the subject tracking engine 110 to create subjects by combining candidate joints and track movement of subjects in the area of real space are presented in U.S. Pat. No. 10,055,853, issued 21 Aug. 2018, titled, "Subject Identification and Tracking Using Image Recognition Engine" which is incorporated herein by reference.

TABLE 1

Inputs, processing and outputs from subject tracking engine 110 in an example embodiment.

| Inputs | Processing | Output |
| --- | --- | --- |
| Arrays of joints data structures per image and for each joints data structure Unique ID Confidence number Joint number 2D (x, y) position in image space | Create joints dictionary Reproject joint positions in the fields of view of cameras with overlapping fields of view to candidate joints | List of located subjects located in the real space at a moment in time corresponding to an identification interval |

Subject Data Structure

The subject tracking engine 110 uses heuristics to connect joints identified by the image recognition engines 112a-112n to locate subjects in the area of real space. In doing so, the subject tracking engine 110, at each identification interval, creates new located subjects for tracking in the area of real space and updates the locations of existing tracked subjects matched to located subjects by updating their respective joint locations. The subject tracking engine 110 can use triangulation techniques to project the locations of joints from 2D image space coordinates (x, y) to 3D real space coordinates (x, y, z). FIG. 5 shows the subject data structure 500 used to store the subject. The subject data structure 500 stores the subject related data as a key-value dictionary. The key is a "frame_id" and the value is another key-value dictionary where key is the camera_id and value is a list of 18 joints (of the subject) with their locations in the real space. The subject data is stored in the subject database 150. A subject is assigned a unique identifier that is used to access the subject's data in the subject database.

In one embodiment, the system identifies joints of a subject and creates a skeleton (or constellation) of the subject. The skeleton is projected into the real space indicating the position and orientation of the subject in the real space. This is also referred to as "pose estimation" in the field of machine vision. In one embodiment, the system displays orientations and positions of subjects in the real space on a graphical user interface (GUI). In one embodiment, the subject identification and image analysis are anonymous, i.e., a unique identifier assigned to a subject created through joints analysis does not identify personal identification information of the subject as described above.

For this embodiment, the joints constellation of a subject, produced by time sequence analysis of the joints data structures, can be used to locate the hand of the subject. For example, the location of a wrist joint alone, or a location based on a projection of a combination of a wrist joint with an elbow joint, can be used to identify the location of hand of a subject.

Directional Impressions

Figure 6:
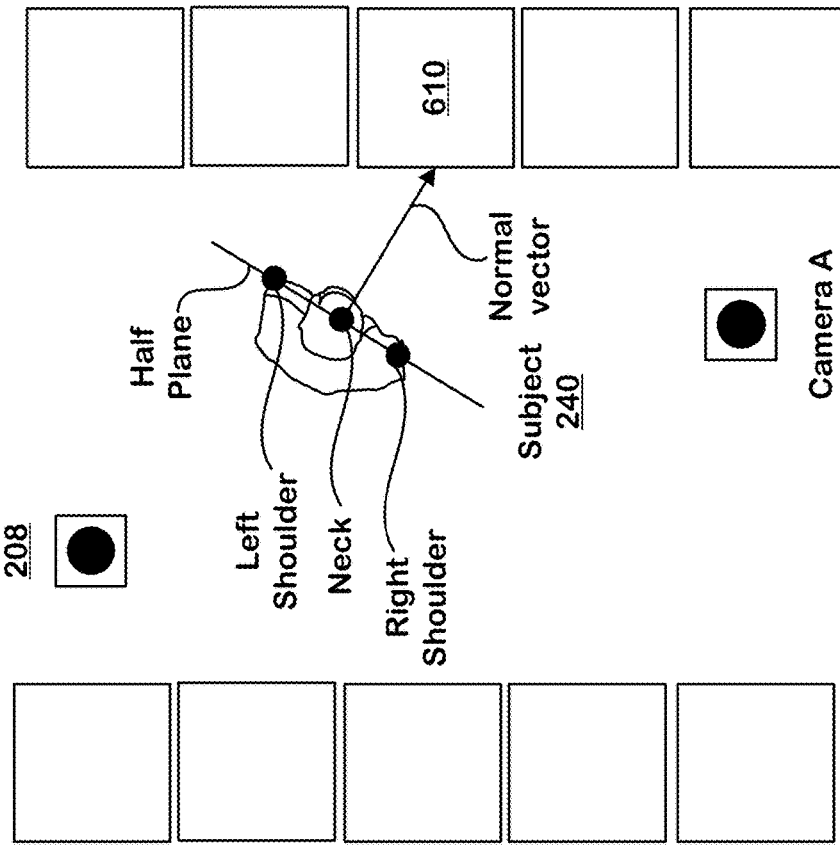
FIG. 6 is a top view showing a plane formed by connecting neck and shoulder joints of an identified subject and a vector normal to the plane, corresponding to the gaze direction of the identified subject.

FIG. 6 shows a top view of subject 240, located in the aisle 116a and positioned in front of the shelf unit B 204. The technology disclosed uses the sequences of images produced by at least two cameras, 206 and 208, in the plurality of cameras to find a location of the subject 240. Joints of a single subject can appear in image frames of multiple cameras in a respective image channel. In the example of a shopping store, the subjects can move in the area of real space between shelf units and in open areas. The technology disclosed uses image recognition engines 112a-n to locate and track subjects in the area of real space. In one embodiment, the image recognition engines are implemented as convolutional neural networks (CNNs) also referred to as JointsCNN. As described above, details of the logic applied by the subject tracking engine 110 to locate subjects by combining candidate joints and track movement of subjects in the area of real space are presented in U.S. Pat. No. 10,055,853, issued 21 Aug. 2018, titled, "Subject Identification and Tracking Using Image Recognition Engine" which is incorporated herein by reference.

In the embodiment, in which the subject tracking engine uses joints to locate and track subjects in the area of real space, each tracked subject is represented as a constellation of joints. FIG. 6 shows a top view (looking down) of the subject 240 to illustrate how the joints of the subject are used to create a half plane. In one embodiment, the technology disclosed uses positions of a left shoulder joint, neck and right shoulder joint to form a half plane that passes through the body of the subject and is positioned normal to the floor of the area of real space. In another embodiment, the technology disclosed can use sequences of frames in a plurality of sequences of frames received from the cameras 114 to identify facial features of the subjects. The facial features can include for example, hair color, left-eye, right-eye, mouth, nose, left-ear, right-ear, etc. In this embodiment, the image recognition engines 112a-n are trained using facial key-point data including facial features listed above. After training, the system detects facial features of the subjects in the area of real space in real time and uses the facial features to form a half planes for subjects as shown in FIG. 6.

The technology disclosed identifies gaze directions of the subject in the area of real space by identifying a vector normal to the half plane formed by the above presented analysis. In one embodiment, the starting position of the normal vector is at the location of the neck joint of the subject as shown in FIG. 6. Therefore, the normal vector is parallel to the floor of the area of real space at a height equal to the height (or length along z-axis) of the neck joint from the floor. The position at which the normal vector intersects with the inventory display structure or shelf unit B 204 at is shown at a location 610. The location 610 can be a cell corresponding to a 2D or 3D grid of inventory display structures as defined in the planogram and stored in the maps database 140.

Figure 7A:
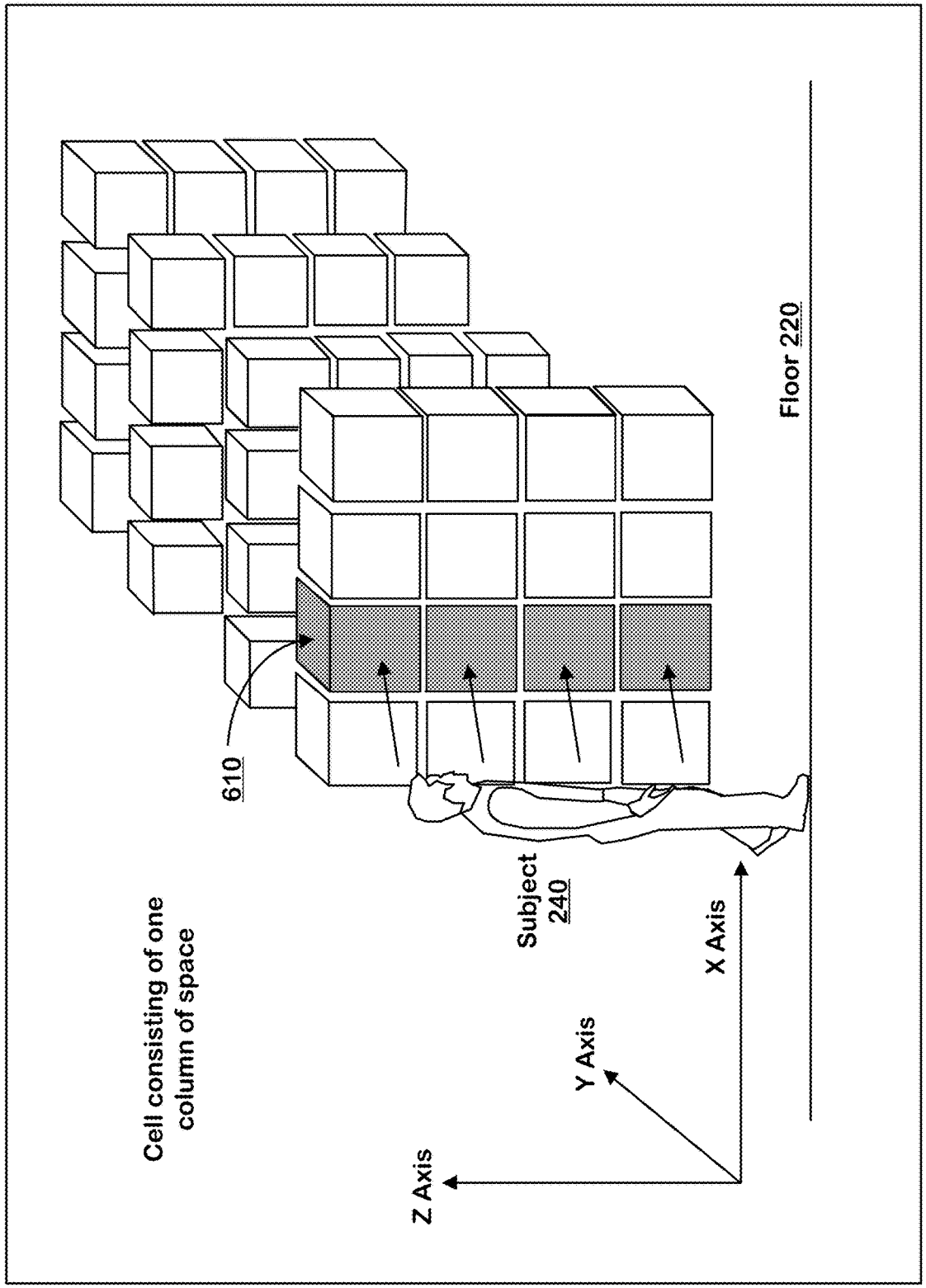
FIG. 7A illustrates a column in the area of real space at the intersection of vectors in the gaze direction positioned at increasing distance from the floor.

FIG. 7A shows a perspective view of the subject and the inventory display structure of FIG. 6. In FIG. 6, it was shown that the normal vector, corresponding to the gaze direction of the subject starts at the neck joint of the subject and intersects the inventory display structure. However, as explained earlier, the technology disclosed includes variations in gaze direction of the subject that are small enough to be considered the same gaze direction. Due to these variations, the subject can look at the items positioned above and below the cell that intersects with the normal vector. Therefore, in FIG. 7A, the cell 610 from FIG. 6A is shown as an entire column in the inventory display structure. In this embodiment, the items located in the column 610 are in the gaze direction of the subject.

Figure 7B:
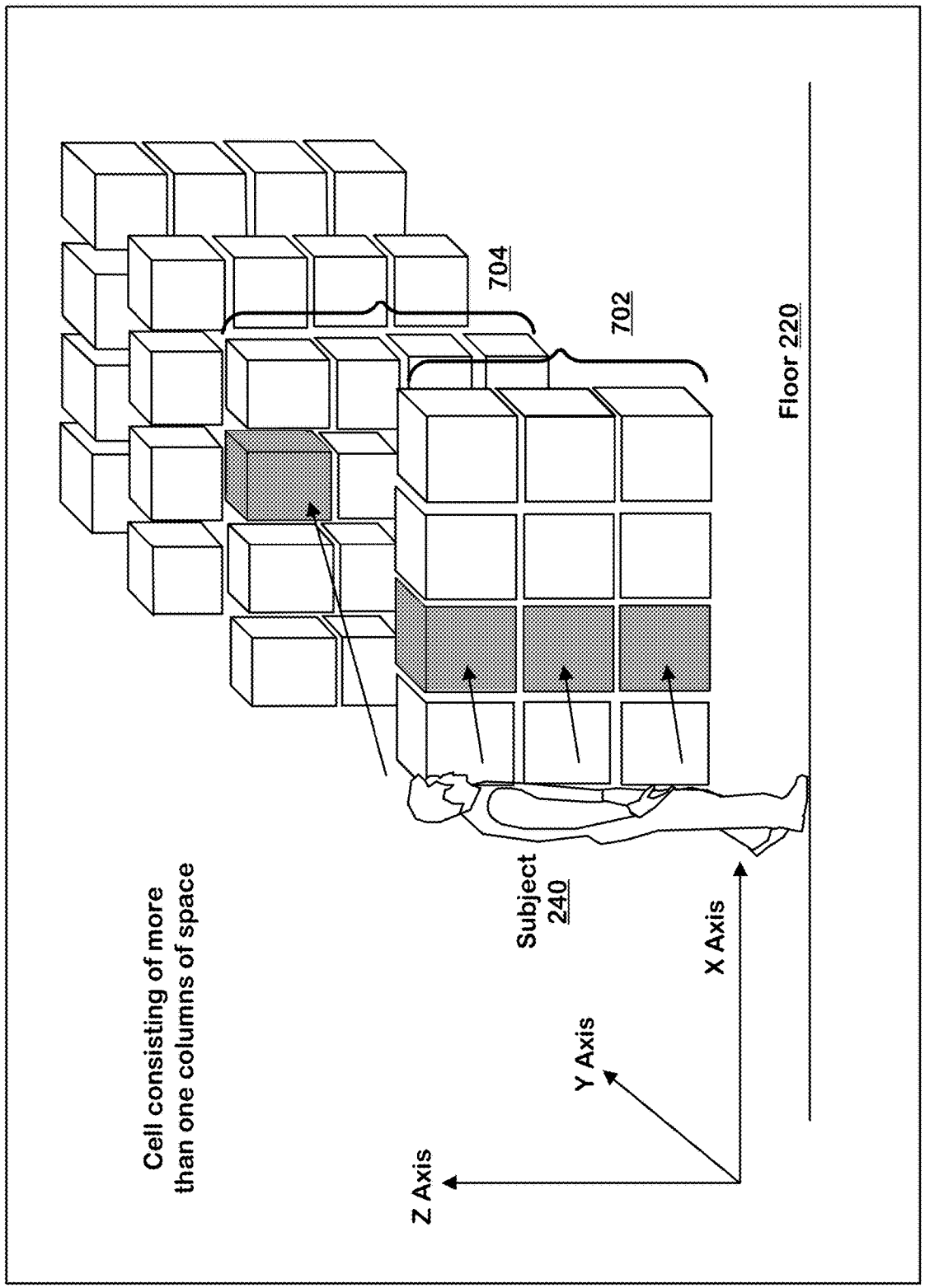
FIG. 7B illustrates a column of space at the intersection of vectors in the gaze direction of the subject when a first inventory display structure positioned closer to the subject is shorter in height than a second inventory display structure positioned behind the first inventory display structure.

In one embodiment, a plurality of vectors, parallel to the normal vector are constructed as shown in FIG. 7A. These vectors are arranged according to increasing distance from the floor. For example, starting at z=0 (at floor) and up to z=10 feet with 1 foot intervals. In one embodiment, the technology disclosed defines the gaze directions of the subject as planes orthogonal to the floor in the area of real space. The plane includes the normal vector corresponding to the gaze direction of the identified subject. The technology disclosed determines the items located at inventory locations matching the intersection of the vectors or the orthogonal plane with the inventory display structures. FIG. 7B presents application of the technology disclosed in a shopping store in which inventory display structures can have different heights. In the example, shown in FIG. 7B, the inventory display structure 702 positioned closer to the subject 240 is shorter in height than the inventory display structure 704 positioned behind the inventory display structure 702. Therefore, a portion of the inventory display structure 704 is in the gaze directions of the subject 240. In this example, items having locations matching the top portion of the shelf 704 are also in the gaze directions of the subject 240.

Figure 8:
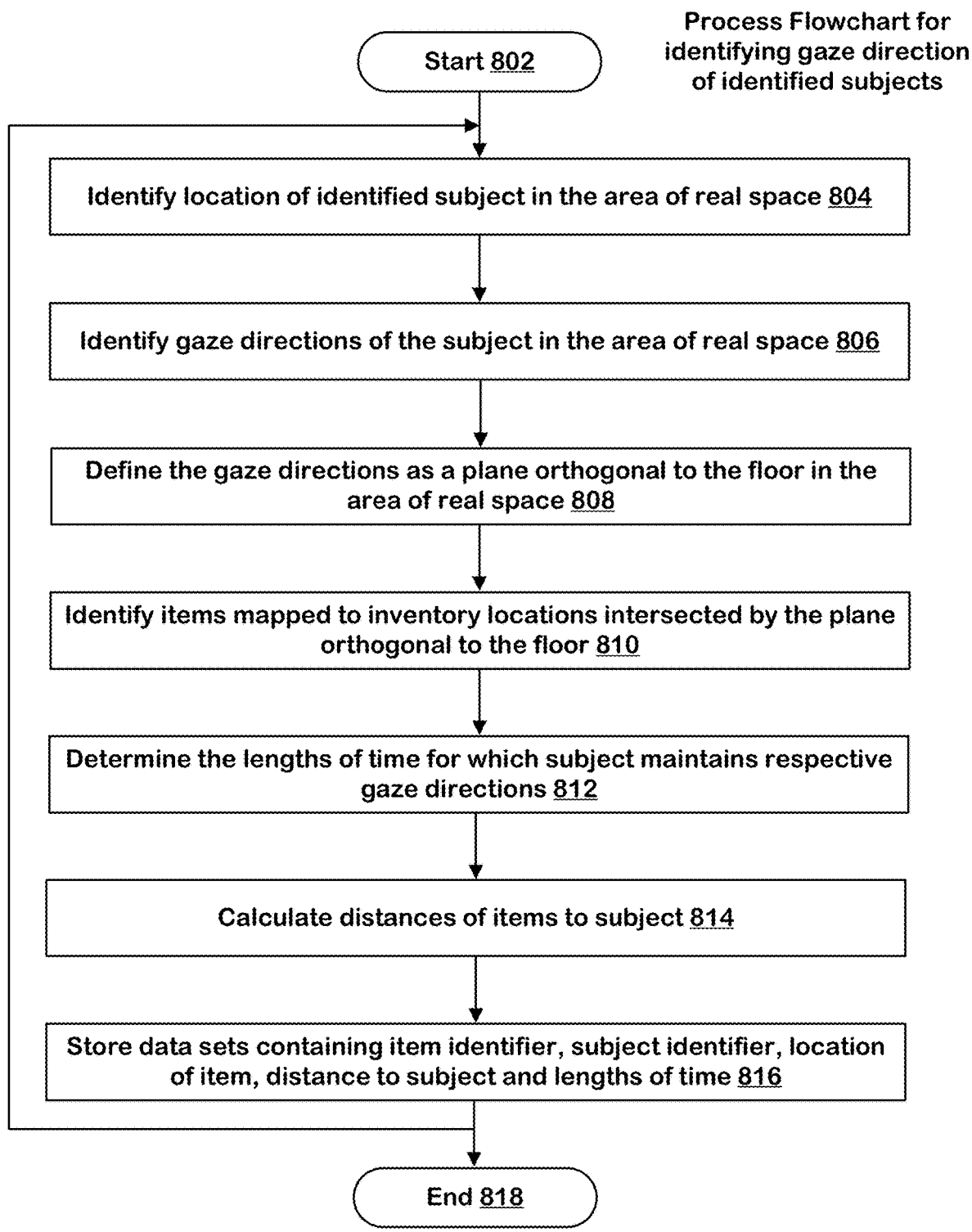
FIG. 8 is an example flowchart for identifying gaze directions of identified subjects in the area of real space.

FIG. 8 is a flowchart presenting process steps for identifying gaze directions of subjects in the area of real space. In the example of a shopping store, the subjects are customers (or shoppers) moving in the store in aisles between shelves and other open spaces. The process starts at step 802. At step 804, the system identifies location of identified subject in the area of real space. In one embodiment, the system uses sequences of frames in a plurality of sequences of frames to identify locations of a subject and track the subject over time. The system can include image recognition engines, which process the sequences of frames to generate corresponding arrays of joint data structures and to identify sets of joints as subjects in the real space. In another embodiment, the system can use facial data of the subjects to locate and track subjects in the area of space. In other embodiments, combinations of these two techniques, i.e., using joints and facial features, can be used to locate and track subjects in the area of real space. As described above, the system can link the tracked subject with a user account to identify the subject. In one embodiment, this process is anonymous and the identification of the subject does not include personal identification information. The identified subjects are stored in the subject database 150.

At step 806, the system uses the sequences of frames in a plurality of sequences of frames of corresponding fields of view to identify gaze directions of the identified subjects in the area of real space. As presented in FIG. 6, in one embodiment, the system determines the vector as normal to a half plane formed by the left shoulder, neck and the right shoulder of the identified subject. At step 808, the system defines gaze directions of the subject as planes orthogonal to a floor in the area of real space. The plane includes a vector corresponding to the gaze direction of the identified subject.

As explained in FIGS. 7A and 7B, the planes orthogonal to the floor can also contain multiple vectors parallel to the vector corresponding to the gaze direction of the subject. In one embodiment, the vectors can be positioned at increasing distance from the floor as explained earlier. At step 810, the system identifies inventory locations intersecting the multiple vectors. As presented in FIGS. 7A and 7B, the intersection of vectors with inventory locations can identify a column of space on one or more inventory locations such as inventory display structures having shelves. The system can then find items having locations matching the locations where the vectors intersect with the inventory display structures. In one embodiment, the system identifies items having location matching the location of a column of cells in a 2D or 3D grid. The discretization of inventory display structures in 2D and 3D cells is presented in FIGS. 3A and 3B.

At step 812, the system determines the time duration for which the subject maintains respective gaze directions. The system stores the time durations for which a subject maintains gaze directions in the item-subject correlations database. The information stored includes all items having locations that match the locations in the column of space in gaze direction of the subject. This information can be used by the product manufacturers and store management to determine the interest of shoppers in a particular item.

At step 814, the system calculates distances of the identified subject from items having locations matching the identified gaze directions and stores the calculated distances in the item-subject correlations database 160. In one embodiment, the system calculates the distance by calculating the length of the vector from the neck of the subject to the position where the normal vector intersects with the inventory display structure. This distance can be calculated using the locations of the subject's neck joint and the location of the cell in inventory display structure having the location matching the location of intersection of inventory display structure with the vector. The distance calculation can be performed using the 3D location of the neck joint and the 3D map of the inventory display structures or 2D location of the neck joint and the 2D maps of the inventory display structures. In one embodiment, the system assigns the same distance to all items in the column of space (as shown in FIG. 7A) in the gaze direction of the subject. The range of variation in the gaze direction of the subject in the column of space is small enough to be considered the same gaze direction and therefore, the items in the column of space can be considered at the same distance from the subject. In another embodiment, in which the column of space in the gaze direction consists of cells on multiple inventory display structures (as shown in FIG. 7B), the system can calculate separate distances for items located in separate inventory display structures. The system stores the calculated distances of items from identified subject in the item-subject correlations database 160. Logic in the system to identify items associated with a gaze direction can use the calculated distances to select items to be associated with the gaze.

In one embodiment, the system stores the item and subject information collected above, as data sets in the database (step 816). A dataset can include for each item in the gaze direction of the identified subject, the item identifier (such as SKU), the subject identifier (such as subject_id or tracking_id etc.), location of the item in the area of real space (in a 3D or 2D space), distance of the item from the subject, and the length of time for which the subject maintains the gaze direction. The system accumulates the data sets over time and stores the data sets in the item-subject correlations database 160. The database is configured for use to analyze the data to correlate a particular element of a plurality of data sets with other elements in the plurality of data set sets related to the particular element. In one embodiment, each one of these correlations is referred to as a "directional impression". Some examples, of such directional impressions are presented below.

The system can correlate a particular item of a plurality of data sets with identified subjects in the plurality of data sets related to the particular item and display on a user interface a graphical construct. The graphical construct can indicate correlations of the particular item to the plurality of identified subjects in multiple locations in the area of real space. For example, the system can determine a "unique visitor directional impression" from the data sets stored in the database. The unique visitor directional impression identifies a number of unique subjects who looked at an item (identified by a unique SKU). The system can calculate the unique visitor directional impression over a period of time such as an hour, a day, a week or a month. The system can also determine the unique visitor directional impression for less than an hour for example, per second or per minute.

The system can also determine other directional impressions using the data sets e.g., the lengths of time for which items are in the gaze directions of a particular identified subject during that subject's presence in the area of real space. The system can generate heat maps of area of real space indicating the locations where the items are in the gaze directions of the subject. Over a period of time and across multiple subjects, this analysis can help identify locations in the area of real space where subjects spend more time or items in those locations in which subjects show more interest. This information can be used by the store management to more effectively use the different locations in the stores when stocking items and update the store planograms accordingly. The process presented in the flowchart in FIG. 8 ends at a step 818.

Figure 9:
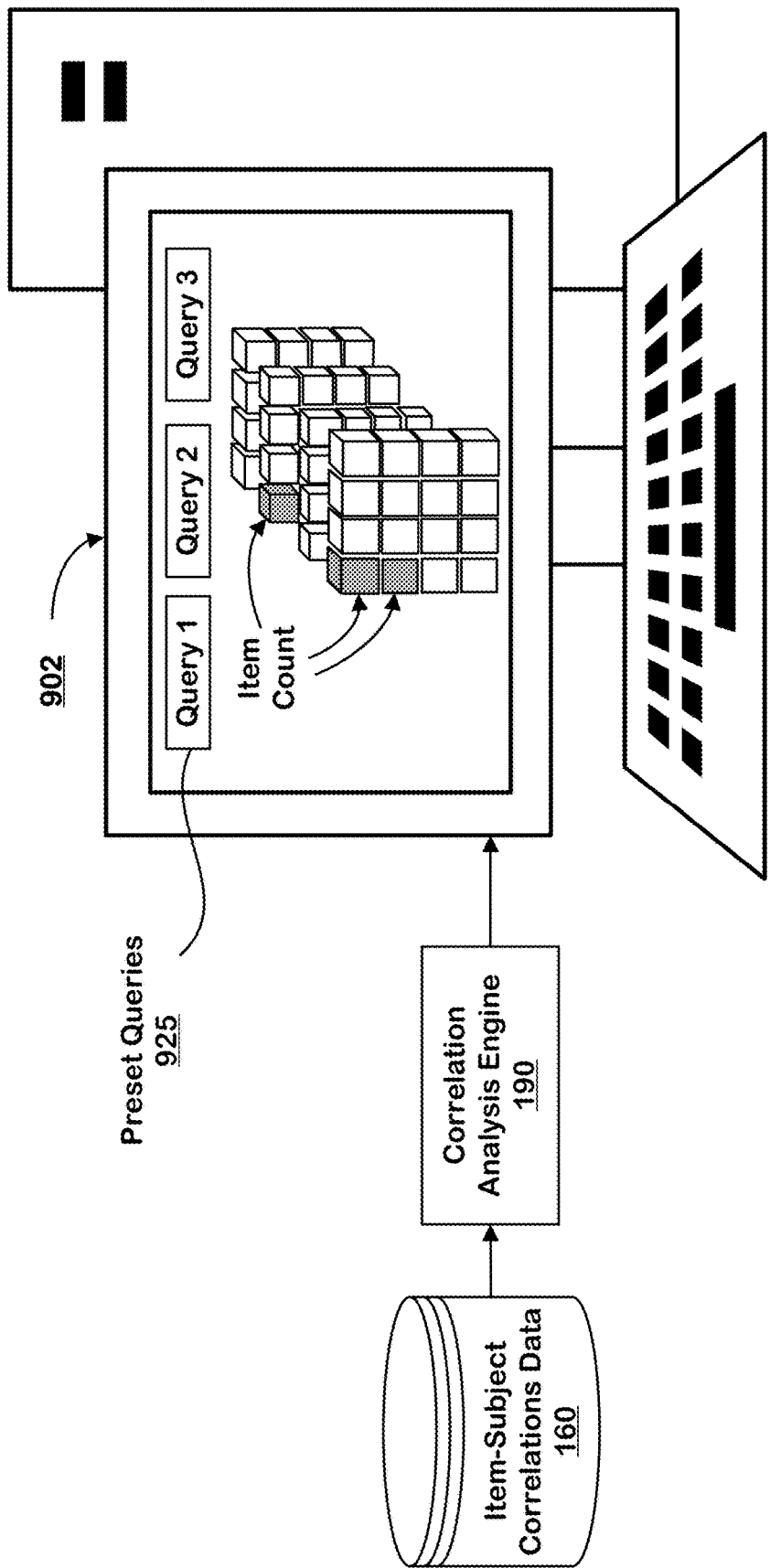
FIG. 9 is an example user interface with preset queries for correlation analysis.

FIG. 9 shows an example user interface 902 of a computing device that can be used for presenting results of correlation analysis of the data sets stored in the item-subject correlations database 160. The technology disclosed includes preset queries 925 as shown in FIG. 9 to query the data sets and generate different types of results. For example, the user interface shows item count for unique visitor directional impression by executing a preset query. The user interface also displays a view of the inventory display structures indicating the inventory locations where the particular item was in the gaze direction of the unique subjects in the store. The system enables the users to query the database 160 to determine various correlations of items and subjects stored in the data sets.

Network Configuration

Figure 10:
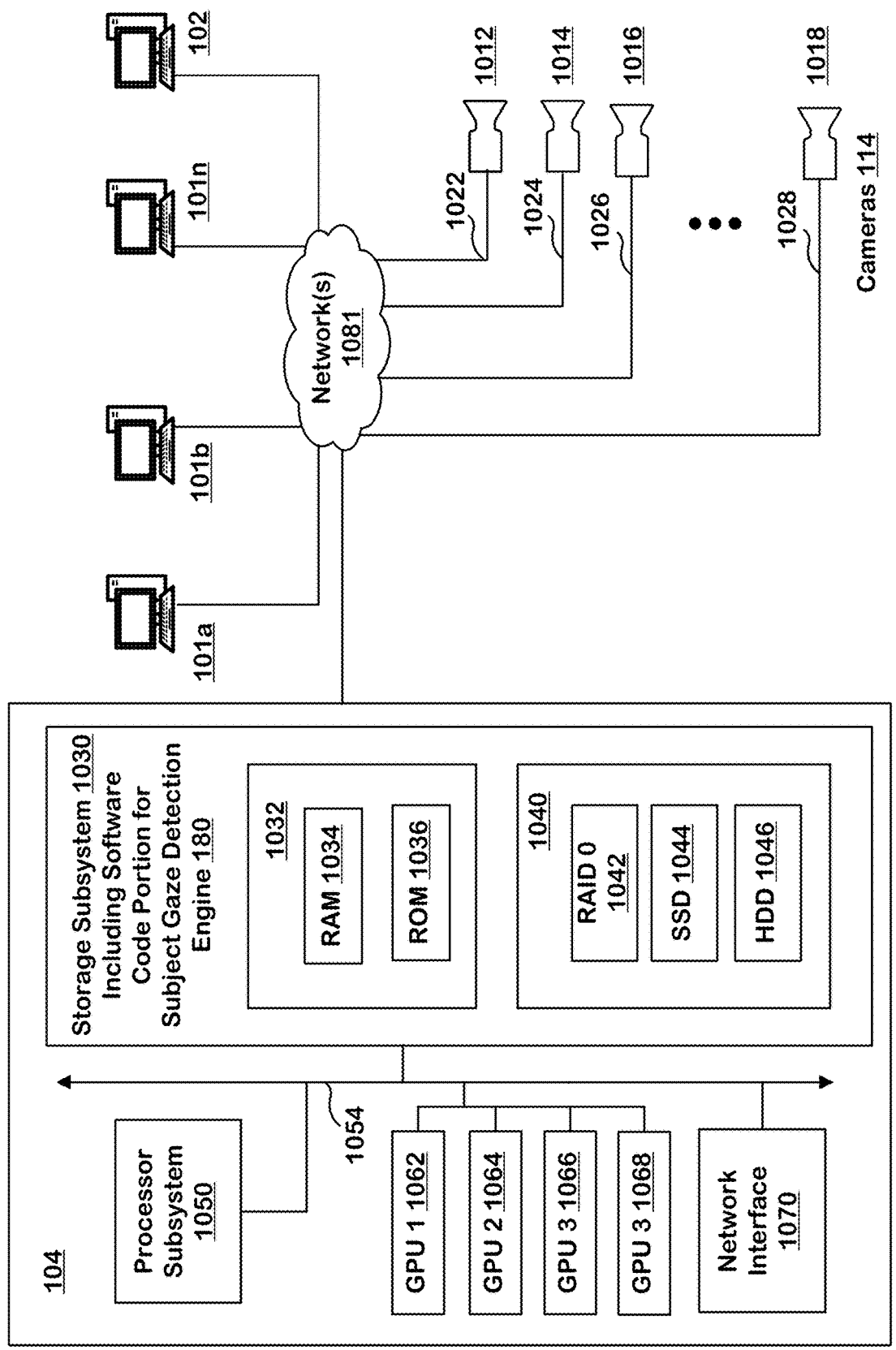
FIG. 10 is a camera and computer hardware arrangement configured for hosting the subject gaze detection engine of FIG. 1

FIG. 10 presents architecture of a network hosting the subject gaze detection engine 180 which is hosted on the network node 104. The system includes a plurality of network nodes 101a, 101b, 101n, and 102 in the illustrated embodiment. In such an embodiment, the network nodes are also referred to as processing platforms. Processing platforms (network nodes) 103, 101a-101n, and 102 and cameras 1012, 1014, 1016, . . . , 1018 are connected to network (s) 1081. A similar network hosts the correlation analysis engine 190 which is hosted on the network node 106.

FIG. 10 shows a plurality of cameras 1012, 1014, 1016, . . . , 1018 connected to the network(s). A large number of cameras can be deployed in particular systems. In one embodiment, the cameras 1012 to 1018 are connected to the network(s) 1081 using Ethernet-based connectors 1022, 1024, 1026, and 1028, respectively. In such an embodiment, the Ethernet-based connectors have a data transfer speed of 1 gigabit per second, also referred to as Gigabit Ethernet. It is understood that in other embodiments, cameras 114 are connected to the network using other types of network connections which can have a faster or slower data transfer rate than Gigabit Ethernet. Also, in alternative embodiments, a set of cameras can be connected directly to each processing platform, and the processing platforms can be coupled to a network.

Storage subsystem 1030 stores the basic programming and data constructs that provide the functionality of certain embodiments of the present invention. For example, the various modules implementing the functionality of the subject gaze detection engine 180 may be stored in storage subsystem 1030. The storage subsystem 1030 is an example of a computer readable memory comprising a non-transitory data storage medium, having computer instructions stored in the memory executable by a computer to perform all or any combination of the data processing and image processing functions described herein including logic to identify gaze directions of the subject, and to determine items having locations matching the gaze directions of the subject in the area of real space by processes as described herein. In other examples, the computer instructions can be stored in other types of memory, including portable memory, that comprise a non-transitory data storage medium or media, readable by a computer.

These software modules are generally executed by a processor subsystem 1050. A host memory subsystem 1032 typically includes a number of memories including a main random access memory (RAM) 1134 for storage of instructions and data during program execution and a read-only memory (ROM) 1036 in which fixed instructions are stored. In one embodiment, the RAM 1034 is used as a buffer for storing point cloud data structure tuples generated by the inventory event location processing engine 180.

A file storage subsystem 1040 provides persistent storage for program and data files. In an example embodiment, the storage subsystem 1040 includes four 120 Gigabyte (GB) solid state disks (SSD) in a RAID 0 (redundant array of independent disks) arrangement identified by a numeral 1042. In the example embodiment, maps data in the maps database 140, inventory events data in the inventory events database 150, inventory item activity data in the inventory item activity database 160, and the inventory item correlation data in the inventory item correlation database 170 which is not in RAM is stored in RAID 0. In the example embodiment, the hard disk drive (HDD) 1046 is slower in access speed than the RAID 0 1042 storage. The solid state disk (SSD) 1044 contains the operating system and related files for the inventory event location processing engine 180.

In an example configuration, four cameras 1012, 1014, 1016, 1018, are connected to the processing platform (network node) 103. Each camera has a dedicated graphics processing unit GPU 1 1062, GPU 2 1064, GPU 3 1066, and GPU 4 1068, to process images sent by the camera. It is understood that fewer than or more than three cameras can be connected per processing platform. Accordingly, fewer or more GPUs are configured in the network node so that each camera has a dedicated GPU for processing the image frames received from the camera. The processor subsystem 1050, the storage subsystem 1030 and the GPUs 1062, 1064, and 1066 communicate using the bus subsystem 1054.

A network interface subsystem 1070 is connected to the bus subsystem 1054 forming part of the processing platform (network node) 104. Network interface subsystem 1070 provides an interface to outside networks, including an interface to corresponding interface devices in other computer systems. The network interface subsystem 1070 allows the processing platform to communicate over the network either by using cables (or wires) or wirelessly. A number of peripheral devices such as user interface output devices and user interface input devices are also connected to the bus subsystem 1154 forming part of the processing platform (network node) 104. These subsystems and devices are intentionally not shown in FIG. 10 to improve the clarity of the description. Although bus subsystem 1054 is shown schematically as a single bus, alternative embodiments of the bus subsystem may use multiple busses.

In one embodiment, the cameras 114 can be implemented using Chameleon3 1.3 MP Color USB3 Vision (Sony ICX445), having a resolution of 1288×964, a frame rate of 30 FPS, and at 1.3 MegaPixels per image, with Varifocal Lens having a working distance (mm) of 300-∞, a field of view field of view with a ⅓" sensor of 98.2°-23.8°.

Any data structures and code described or referenced above are stored according to many implementations in computer readable memory, which comprises a non-transitory computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method including:
using sequences of frames produced by sensors to identify (i) locations of identified subjects in an area of real space and (ii) interest, by the identified subjects, in identified items positioned at locations in the area of real space over time;
storing the identified items for which interest was identified as entries in a database, the entries including an item identifier and a location of the items in the area of real space; and
generating a heat map of at least a portion of the area of real space, wherein the heat map identifies locations, in the area of real space, of identified items for which the interest by the identified subjects exceeds a threshold.

2. The method of claim 1, further including calculating a unique visitor directional impression from the entries in the database, wherein the unique visitor directional impression identifies a number of unique or distinct subjects who have an interest in identified items.

3. The method of claim 2, further including calculating unique visitor directional impressions over a period of time.

4. The method of claim 2, further including a determining length of time for which an identified subject has interest in a particular identified item and storing the determined length of time in an entry in the entries in the database.

5. The method of claim 4, further including calculating a length of time for which a particular identified item is of interest to a particular identified subject during the particular identified subject's presence in the area of real space.

6. The method of claim 5, further including determining a particular location in the area of real space at which a particular item is of interest to the particular identified subject and displaying a view of the particular location.

7. The method of claim 4, further including calculating a distance of an identified subject from an item positioned at a location in the area of real space, the distance being used to identify an interest of the identified subject in the item.

8. The method of claim 7, wherein the calculating of the distance of the identified subject from the item uses a location of a neck joint of the identified subject and a location of an inventory display structure in which the item is positioned.

9. The method of claim 1, further including updating a store planogram using the heat map of the area of real space and using the updated store planogram to facilitate stocking of items in the area of real space.

10. A system including one or more processors and a memory, the memory comprising instructions that, when executed, cause the one or more processors to perform operations comprising:
using sequences of frames produced by sensors to identify (i) locations of identified subjects in an area of real space and (ii) interest, by the identified subjects, in identified items positioned at locations in the area of real space;
storing the identified items for which interest was identified as entries in a database, the entries including an item identifier and a location of the items in the area of real space; and
generating a heat map of at least a portion of the area of real space, wherein the heat map identifies locations, in the area of real space, of identified items for which the interest by the identified subjects exceeds a threshold.

11. The system of claim 10, wherein the operations further include calculating a unique visitor directional impression from the entries in the database, wherein the unique visitor directional impression identifies a number of unique or distinct subjects who have in interest in identified items.

12. The system of claim 11, wherein the operations further include calculating unique visitor directional impressions over a period of time.

13. The system of claim 11, wherein the operations further include determining a length of time for which an identified subject has interest in a particular identified item and storing the determined length of time in an entry in the entries.

14. The system of claim 13, wherein the operations further include calculating a length of time for which a particular identified item is of interest to a particular identified subject during the particular identified subject's presence in the area of real space.

15. The system of claim 14, wherein the operations further includes determining a particular location in the area of real space at which a particular item is of interest to the particular identified subject and displays a view of the particular location.

16. The system of claim 13, wherein the operations further includes calculating a distance of an identified subject from an item positioned at a location in the area of real space, the distance being used to identify an interest of the identified subject in the item.

17. The system of claim 16, wherein the calculating of the distance uses a location of a neck joint of the identified subject and a location of an inventory display structure in which the item is positioned.

18. The system of claim 10, wherein the operations further includes updating a store planogram using the heat map of the area of real space and use the updated store planogram to facilitate stocking of items in the area of real space.

19. A non-transitory computer readable storage medium impressed with computer program instructions to detect gaze direction of subjects in an area of real space, the instructions, when executed on a processor, implement a method comprising:
- using sequences of frames produced by sensors to identify (i) locations of identified subjects in an area of real space and (ii) interest, by the identified subjects, in identified items positioned at locations in the area of real space over time;
- storing the identified items for which interest was identified as entries in a database, the entries including an item identifier and a location of the items in the area of real space; and
- generating a heat map of at least a portion of the area of real space, wherein the heat map identifies locations, in the area of real space, of identified items for which the interest by the identified subjects exceeds a threshold.

20. The non-transitory computer readable storage medium of claim 19, wherein the method further includes calculating a unique visitor directional impression from the entries in the database, wherein the unique visitor directional impression identifies a number of unique or distinct subjects who have an interest in identified items.

* * * * *